US010061181B2

(12) United States Patent
Bucher et al.

(10) Patent No.: US 10,061,181 B2
(45) Date of Patent: Aug. 28, 2018

(54) METHOD AND SYSTEM FOR PARAMETRIC AMPLIFICATION

(71) Applicant: Technion Research & Development Foundation Limited, Haifa (IL)

(72) Inventors: Izhak Bucher, Haifa (IL); Amit Dolev, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 15/227,260

(22) Filed: Aug. 3, 2016

(65) Prior Publication Data

US 2017/0040913 A1    Feb. 9, 2017

(30) Foreign Application Priority Data

Aug. 3, 2015   (IL) .......................................... 240316

(51) Int. Cl.
| | | |
|---|---|---|
| *G02F 1/39* | (2006.01) | |
| *H02N 11/00* | (2006.01) | |
| *H03H 9/46* | (2006.01) | |
| *H04R 23/02* | (2006.01) | |

(52) U.S. Cl.
CPC ............. *G02F 1/39* (2013.01); *H02N 11/002* (2013.01); *H03H 9/46* (2013.01); *G02F 2001/392* (2013.01); *H04R 23/02* (2013.01)

(58) Field of Classification Search
CPC .............................. G02F 1/39; G02F 2001/392
See application file for complete search history.

(56) References Cited

U.S. PATENT DOCUMENTS

| | | | |
|---|---|---|---|
| 5,314,308 A | | 5/1994 | Reed, III |
| 6,501,591 B1 * | | 12/2002 | Kumar ..................... G02F 1/395 |
| | | | 359/326 |
| 2010/0003133 A1 | | 1/2010 | Welsh |
| 2010/0221110 A1 | | 9/2010 | Jolly et al. |
| 2011/0198126 A1 | | 8/2011 | Swietlik et al. |
| 2012/0068005 A1 | | 3/2012 | Kessler et al. |
| 2014/0314563 A1 | | 10/2014 | Mayrides et al. |

OTHER PUBLICATIONS

Dolev et al. "A Parametric Amplifier for Weak, Low-Frequency Forces", Proceedings of the ASME 2015 International Sesign Engineering Technical Conferences & Computers and Information in Engineering Conference, IDETC/CIE 2015, Boston, MA, USA, Aug. 2-5, 2015, DETC2015-46273, p. 1-8, Aug. 2015.

(Continued)

*Primary Examiner* — Daniel Petkovsek

(57) ABSTRACT

A system for converting an input oscillation having an input frequency into an output oscillation having an output frequency is disclosed. The system comprises: a controller configured for receiving the input oscillation and responsively generating a multi-component drive signal. A frequency of at least one component of the drive signal is other than two times the input frequency. In some embodiments, a frequency of another component of the drive signal equals about two times the output frequency. The system also comprises an oscillator for generating pump oscillations responsively to the drive signal and applying parametric excitation to the input oscillation at the pump oscillations.

17 Claims, 17 Drawing Sheets
(17 of 17 Drawing Sheet(s) Filed in Color)

(56) References Cited

OTHER PUBLICATIONS

Dolev et al. "Experimental and Numerical Validation of Digital, Electromechanical, Parametrically Excited Amplifiers", Journal of Vibration and Acoustics, 138(6):061001-1-061001-14, Dec. 2016.
Dolev et al. "Tuneable, Non-Degenerated, Nonlinear, Parametrically-Excited Amplifier", Journal of Sound and Vibration, 361: 176-189, Available Online Oct. 23, 2015.
Office Action and Search dated Jul. 26, 2016 from the Israel Patent Office Re. Application No. 240316. (16 Pages).
Office Action dated Aug. 20, 2015 from the Israel Patent Office Re. Application No. 240316. (2 Pages).

* cited by examiner

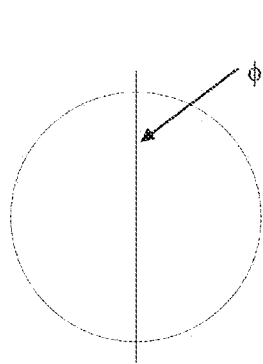
FIG. 17A
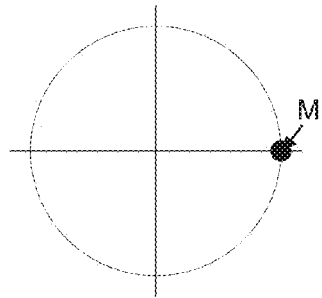
FIG. 17B
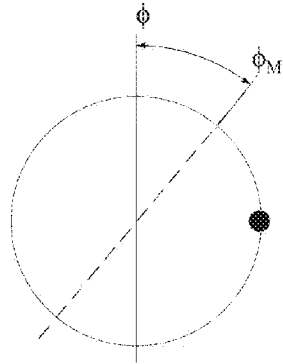
FIG. 17C
FIG. 18A
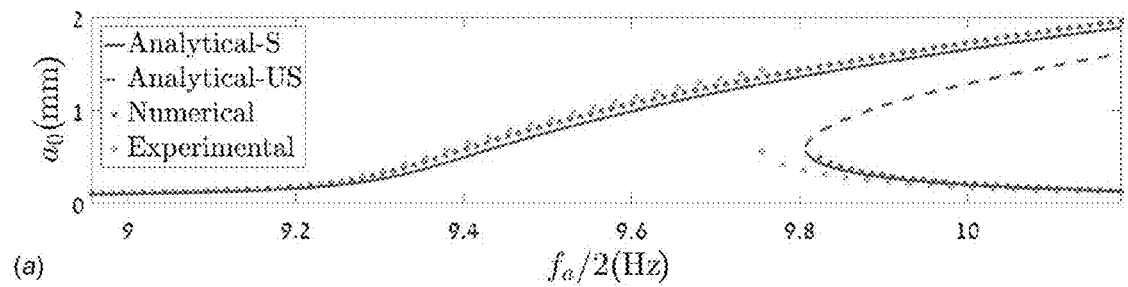
(a)
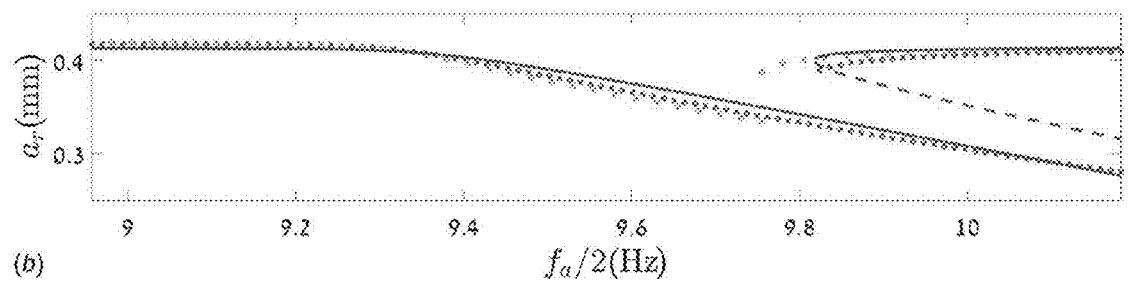
(b)
FIG. 18B

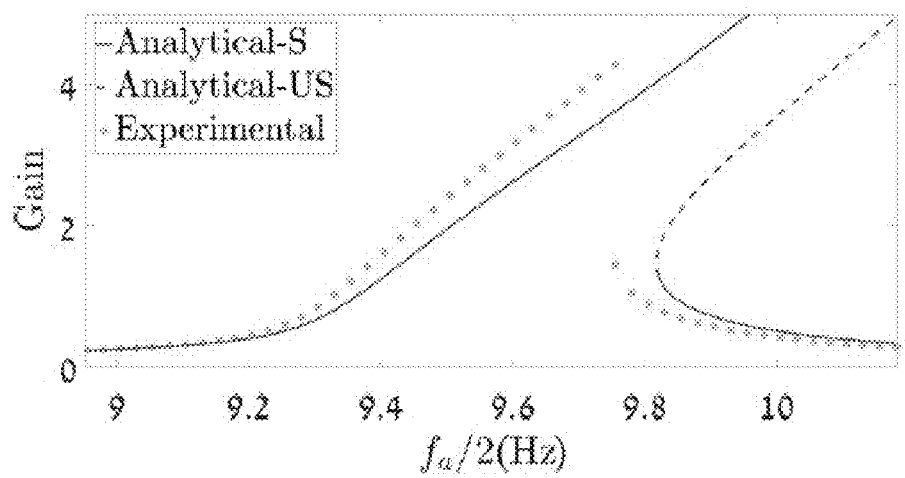
FIG. 19
FIG. 20A
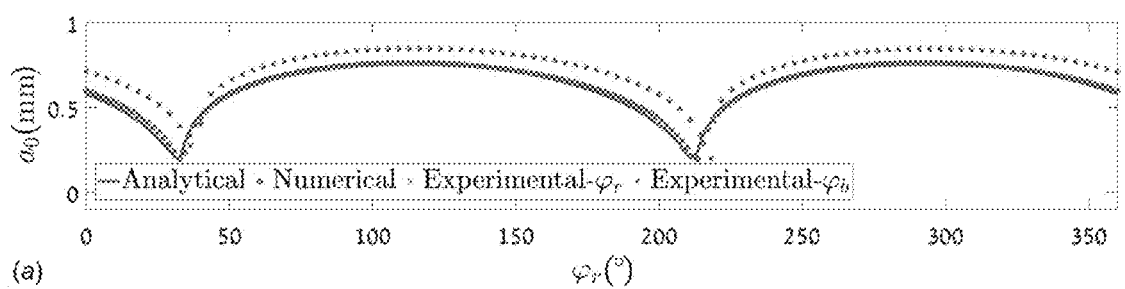
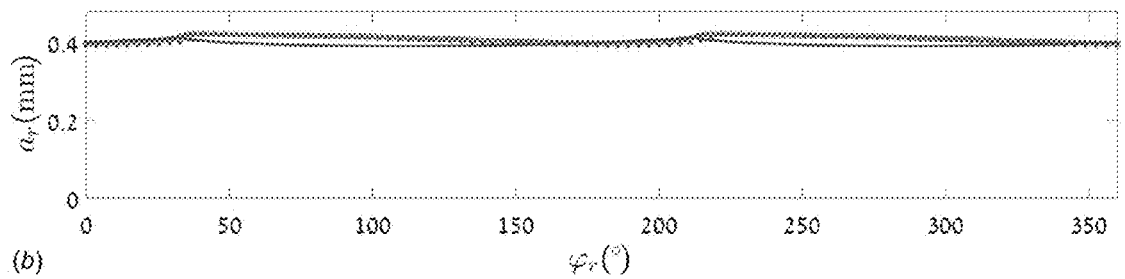
FIG. 20B

FIG. 21A
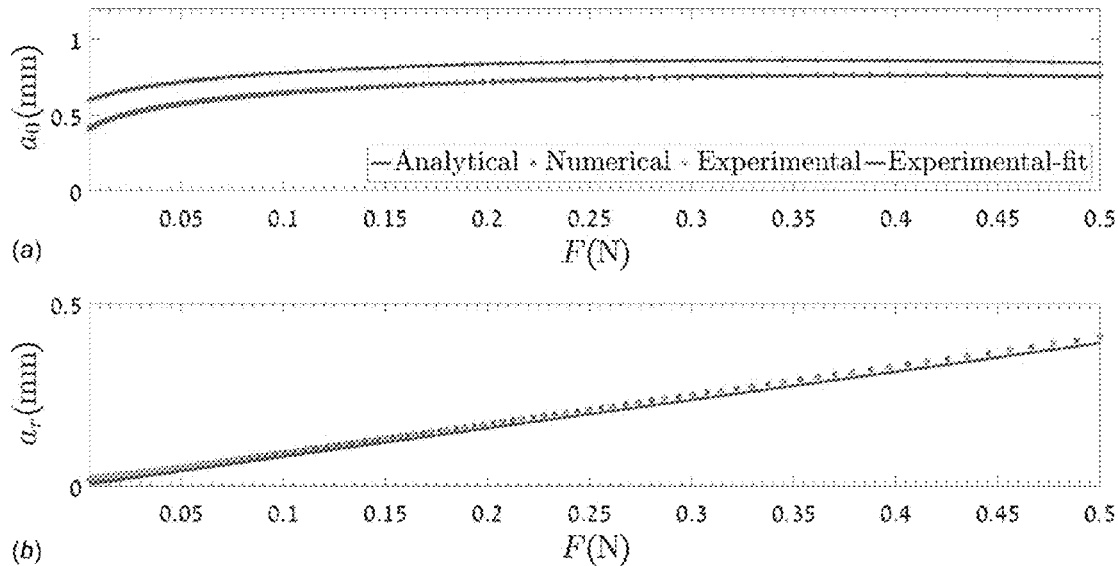
FIG. 21B
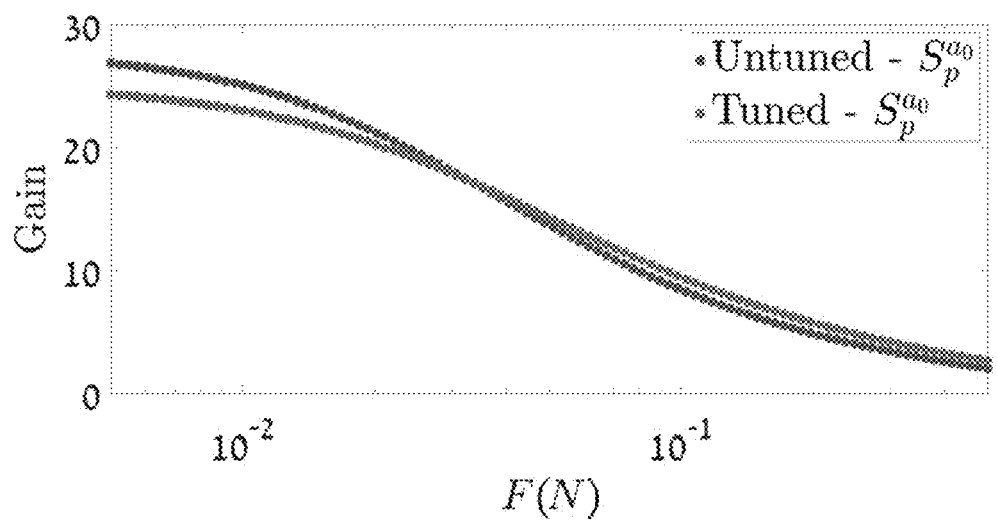
FIG. 22

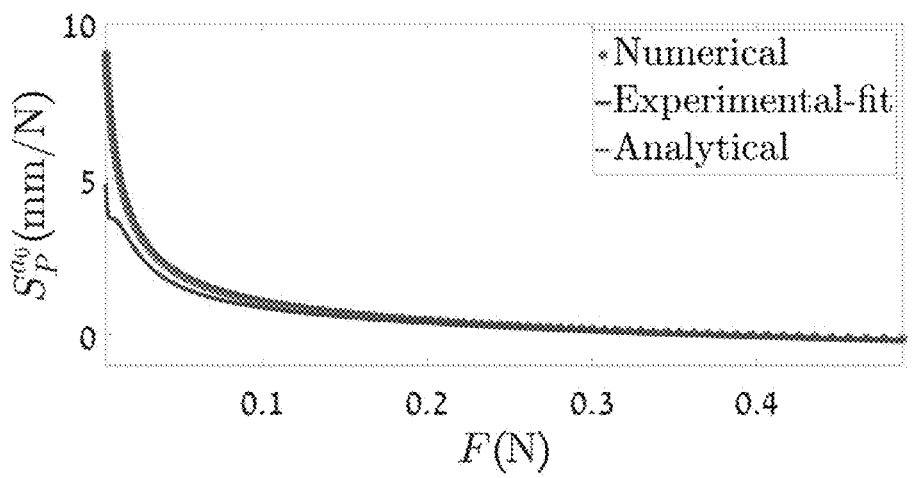
FIG. 23
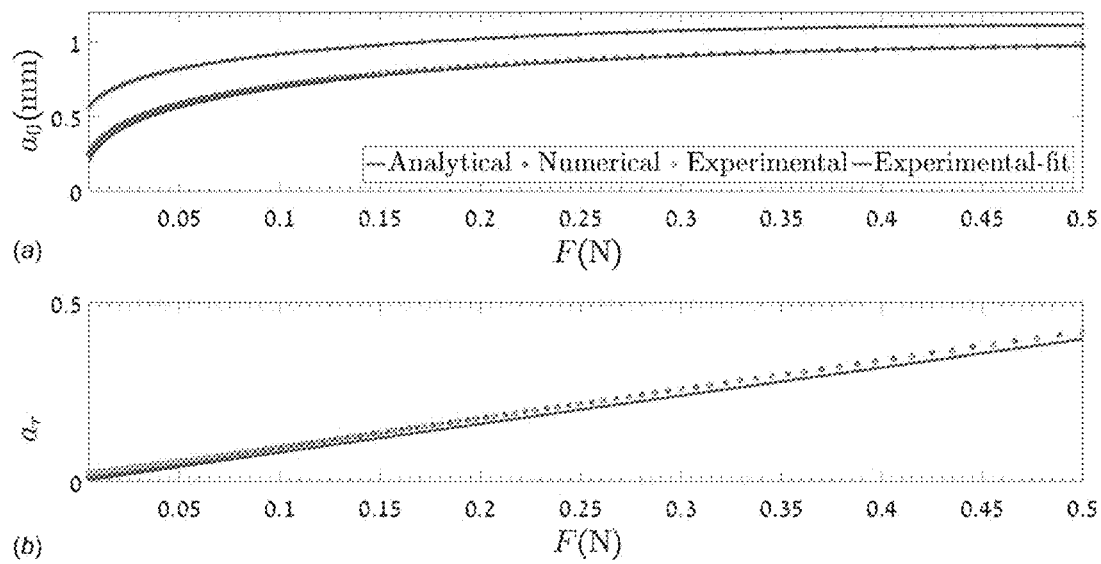
FIG. 24A
FIG. 24B

METHOD AND SYSTEM FOR PARAMETRIC AMPLIFICATION

RELATED APPLICATION

This application claims the benefit of priority of Israel Patent Application No. 240316 filed on Aug. 3, 2015, the contents of which are incorporated herein by reference in their entirety.

FIELD AND BACKGROUND OF THE INVENTION

The present invention, in some embodiments thereof, relates to amplification and, more particularly, but not exclusively, to a method and a system for parametric amplification.

Parametric amplification is a technique employed in oscillating systems wherein a parameter (e.g., inertia, a spring constant or affecting element's elastic stiffness) is modulated to produce amplification in the response of the system. Parametric amplifiers have generated sustained interest because their operational noise can be low. Parametric amplifiers typically combine a pump signal with an input signal to effect amplification or frequency conversion of the input signal.

Several implementations of this technique have been utilized in electronic systems, optical systems, and electromechanical systems. For example, U.S. Pat. No. 6,900,575 discloses a mechanical parametric device including two electrostatically coupled resonators, wherein a first resonator oscillates in response to an input signal, and a second resonator provides a feedback to amplify the oscillation of the first resonator.

Parametric amplifiers can be characterized as degenerate or non-degenerate. In a degenerate parametric amplifier, the frequency of the pump signal equals twice the input signal's frequency which also equals to the natural frequency of the amplifier. For any other relation between the pump signal, input signal and amplifier natural frequencies, the amplifier is characterized as a non-degenerate parametric amplifier. Degenerate parametric amplification provides a relatively high gain, but is not applicable when the input signal's frequency is not constant and when it does not coincide with the natural frequency. Non-degenerate parametric amplification is useful for input signals whose frequency is not pre-determined, but it has a relatively low gain.

SUMMARY OF THE INVENTION

According to an aspect of some embodiments of the present invention there is provided a system for converting an input oscillation having an input frequency into an output oscillation having an output frequency. The system comprises: a controller configured for receiving the input oscillation and responsively generating a multi-component drive signal, wherein a frequency of at least one component of the drive signal is other than two times the input frequency. The system comprises an oscillator for generating pump oscillations responsively to the drive signal and applying parametric excitation to the input oscillation at the pump oscillations.

According to some embodiments of the invention a frequency of another component of the drive signal equals about two times the output frequency.

According to some embodiments of the invention the controller is configured for receiving a predetermined gain value and selecting amplitude and phase for each component so as to amplify the input oscillation by the received gain value.

According to some embodiments of the invention the controller is configured for receiving a predetermined sensitivity value and selecting amplitude and phase for each component such that a sensitivity of the output oscillation to a change in the input oscillation equals the received sensitivity value.

According to some embodiments of the invention the controller is configured for selecting amplitude and phase for each component so as to provide in-phase output oscillation.

According to some embodiments of the invention the drive signal comprises an amplitude limiter component.

According to some embodiments of the invention the controller is configured for receiving a phase shift value and selecting the amplitude limiter component such as to generate a phase shift of the output oscillation relative to the input oscillation, the generated phase shift being approximately the received phase shift value.

According to an aspect of some embodiments of the present invention there is provided a method of converting an input oscillation having an input frequency into an output oscillation having an output frequency. The method comprises: receiving the input oscillation; generating pump oscillations having a plurality of components, wherein a frequency of at least one of the components is other than two times the input frequency; and applying parametric excitation to the input oscillation at the pump oscillations.

According to some embodiments of the invention a frequency of another component of the plurality of components equals about two times the output frequency.

According to some embodiments of the invention a sum or a difference between the output frequency and the frequency of the at least one component, in absolute value, approximately equals the input frequency.

According to some embodiments of the invention the frequency of the at least one component is other than an integer multiplication of the input frequency.

According to some embodiments of the invention for each component of the drive signal, a frequency of the component is other than an integer multiplication of the input frequency.

According to some embodiments of the invention the method comprises receiving a predetermined gain value and selecting amplitude and phase for each component so as to amplify the input oscillation by the received gain value.

According to some embodiments of the invention the method comprises receiving a predetermined sensitivity value and selecting amplitude and phase for each component such that a sensitivity of the output oscillation to a change in the input oscillation equals the received sensitivity value.

According to some embodiments of the invention method comprises selecting amplitude and phase for each component so as to provide in-phase output oscillation.

According to some embodiments of the invention the oscillator is driven by a drive signal having an amplitude limiter component.

According to some embodiments of the invention the amplitude limiter component varies synchronously and nonlinearly with the output oscillation. According to some embodiments of the invention the nonlinear variation is cubic.

According to some embodiments of the invention the method comprises receiving a phase shift value and selecting the amplitude limiter component such as to generate a phase shift of the output oscillation relative to the input oscillation, the generated phase shift being approximately the received phase shift value.

According to an aspect of some embodiments of the present invention there is provided a method of balancing a rotating structure. The method comprises: rotating a mandrel carrying the structure while sensing rotation imbalance and generating a rotation imbalance signal; generating a multi-component drive signal, wherein a frequency of at least one component of the drive signal is other than two times a frequency of the rotation imbalance signal; oscillating the mandrel, perpendicularly thereto, according to the drive signal; sensing rotation imbalance resulting from the oscillation; and balancing the structure responsively to the resulting rotation imbalance.

According to some embodiments of the invention the method comprises selecting an output frequency being larger than the frequency of the rotation imbalance signal, wherein a frequency of another component of the drive signal equals about two times the output frequency.

According to some embodiments of the invention for each component of the drive signal, a frequency of the component is other than an integer multiplication of the rotation imbalance signal.

According to some embodiments of the invention the method comprises varying a phase corresponding to at least one of the components until minimal oscillation amplitude is obtained.

According to an aspect of some embodiments of the present invention there is provided a system for balancing a rotating structure. The system comprises: a rotatable mandrel constituted for rotating the structure and being suspended on a suspension member capable of being oscillated; a rotation imbalance sensor configured for sensing rotation imbalance of the structure while rotating and generating a rotation imbalance signal; a controller configured for receiving the signal from the sensor and for oscillating the suspension member according to a multi-component drive signal, wherein a frequency of at least one component of the drive signal is other than two times a frequency of the received rotation imbalance signal; and a display for displaying data indicative of signals generated by the sensor.

According to some embodiments of the invention the controller is configured for receiving an output frequency being larger than the frequency of the rotation imbalance signal, and wherein a frequency of another component of the drive signal equals about two times the output frequency.

According to some embodiments of the invention a sum or a difference between the output frequency and the frequency of the at least one component, in absolute value, approximately equals the frequency of the rotation imbalance signal.

According to some embodiments of the invention the frequency of the at least one component is other than an integer multiplication of the frequency of the rotation imbalance signal.

According to some embodiments of the invention for each component of the drive signal, a frequency of the component is other than an integer multiplication of the rotation imbalance signal is non-integer.

According to some embodiments of the invention the controller is configured for varying a phase corresponding to at least one component of the drive signal until minimal oscillation amplitude is obtained.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

This patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system suitable for converting an input oscillation into an output oscillation, according to some embodiments of the present invention;

FIG. 2 is a schematic illustration of an oscillator having a massive body according to some embodiments of the present invention;

FIG. 3 is a schematic illustration of an oscillating and rotating massive structure, according to some embodiments of the present invention;

FIG. 4 is a schematic illustration describing a location of a center of gravity along a rotating structure, according to some embodiments of the present invention;

FIGS. 5A and 5B are schematic illustrations of a cross-sectional view (FIG. 5A) and isometric view (FIG. 5B) of a system suitable for balancing a rotating structure, according to some embodiments of the present invention;

FIG. 6 is a graph showing oscillation amplitude as a function of a phase of one component of a drive signal, according to some embodiments of the present invention;

FIG. 7 shows a response amplitude of a single degree-of-freedom parametric amplifier as a function of a frequency, as obtained by calculations performed according to some embodiments of the present invention;

FIG. 8 is a schematic illustration of a two degree-of-freedom oscillator according to some embodiments of the present invention;

FIGS. 9A and 9B show response amplitudes of a two degree-of-freedom parametric amplifier as a function of a frequency, as obtained by calculations performed according to some embodiments of the present invention;

FIGS. 10A and 10B show modal coordinates of a two degree-of-freedom parametric amplifier as a function of the time, as obtained by calculations performed according to some embodiments of the present invention;

FIG. 11 shows relation between amplitude of a single degree-of-freedom parametric amplifier working above linear instability threshold and amplitude and phase of a external force, as obtained by calculations performed according to some embodiments of the present invention;

Figure 12A:
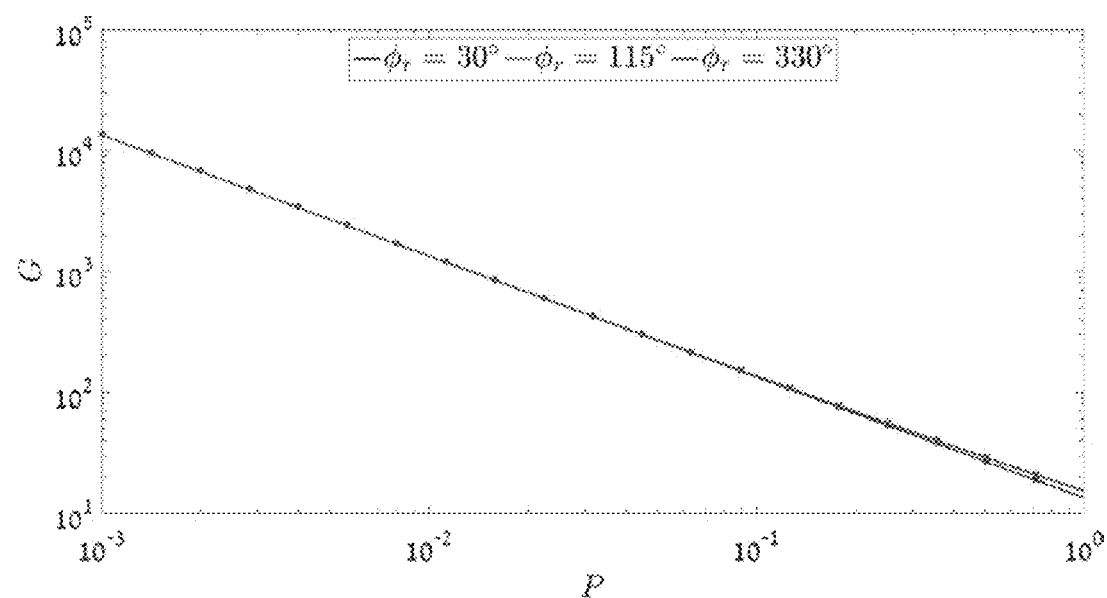
Figure 12B:
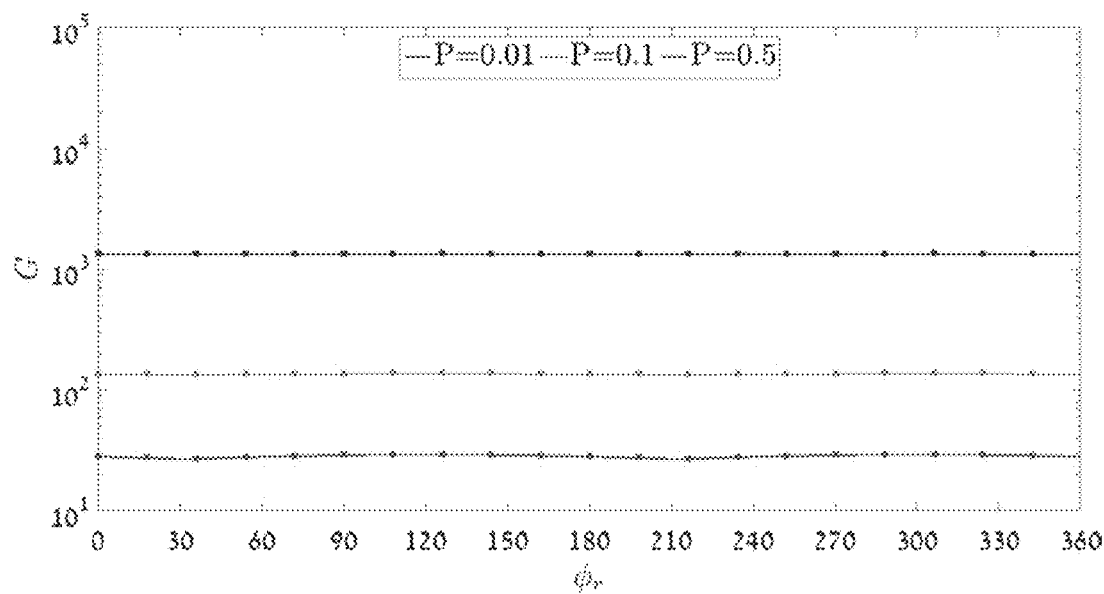
Figure 13:
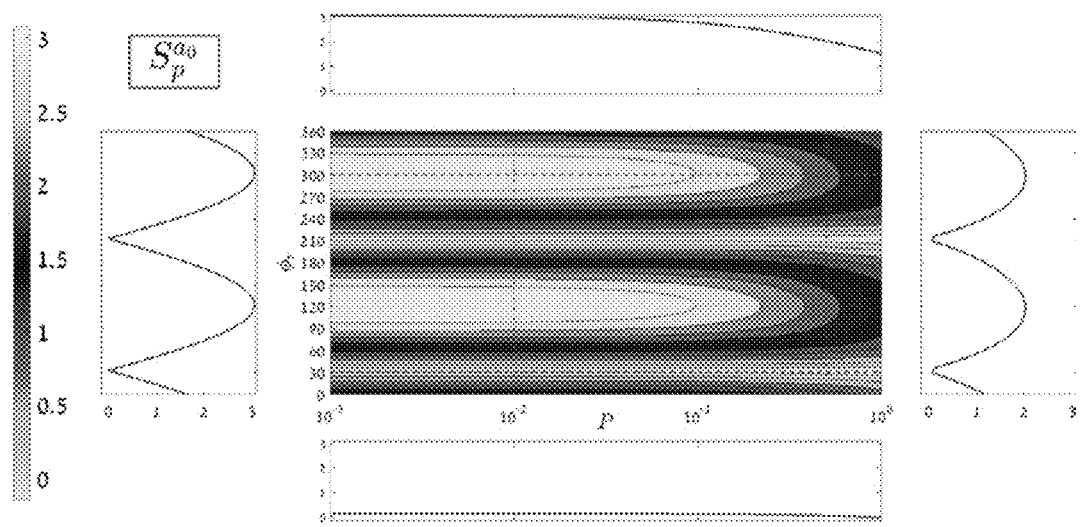
Figure 14A:
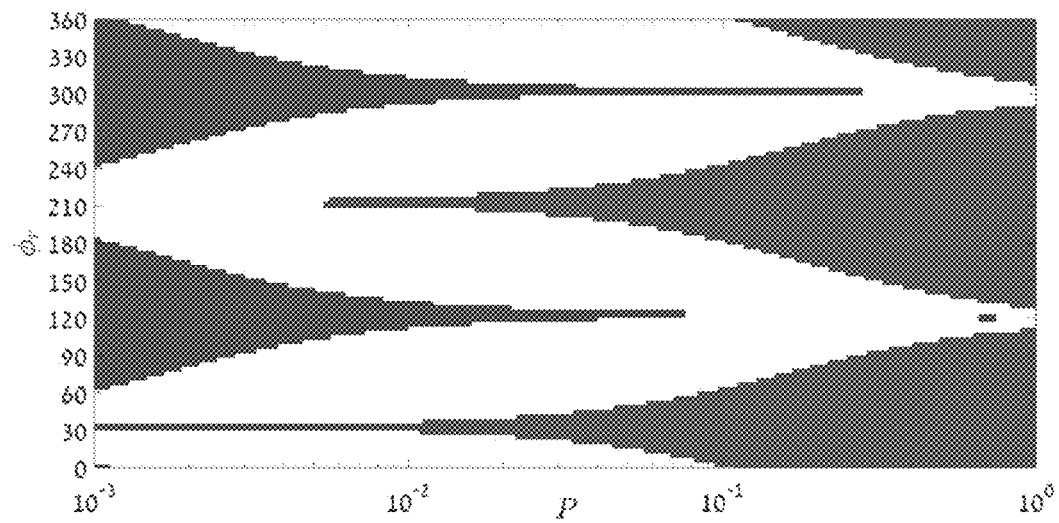
Figure 14B:
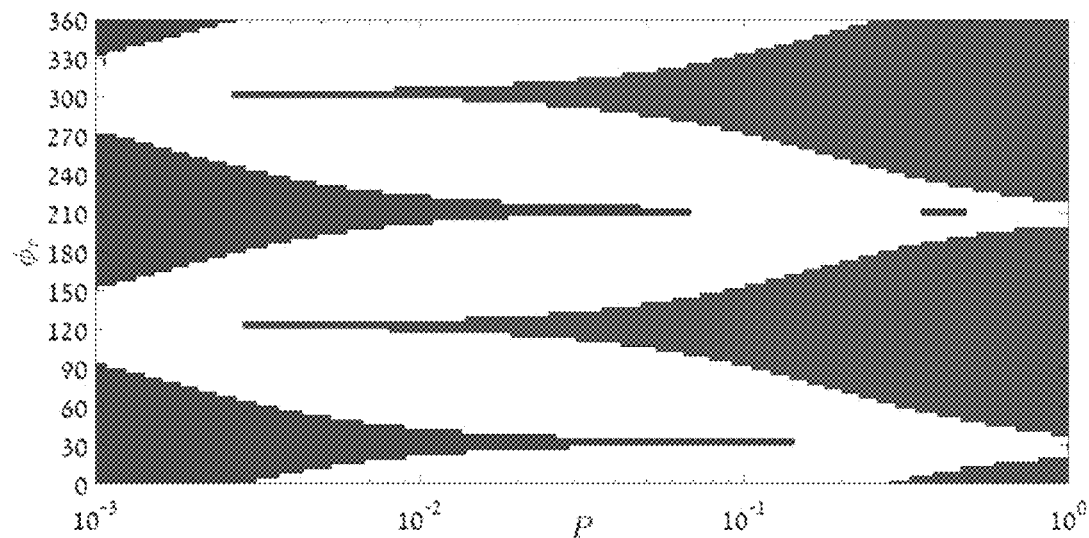
Figure 15A:
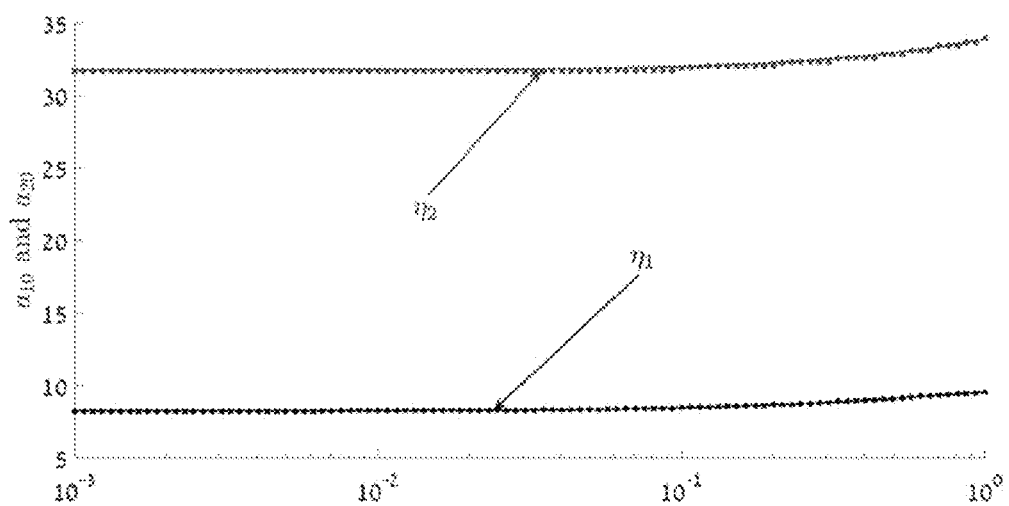
Figure 15B:
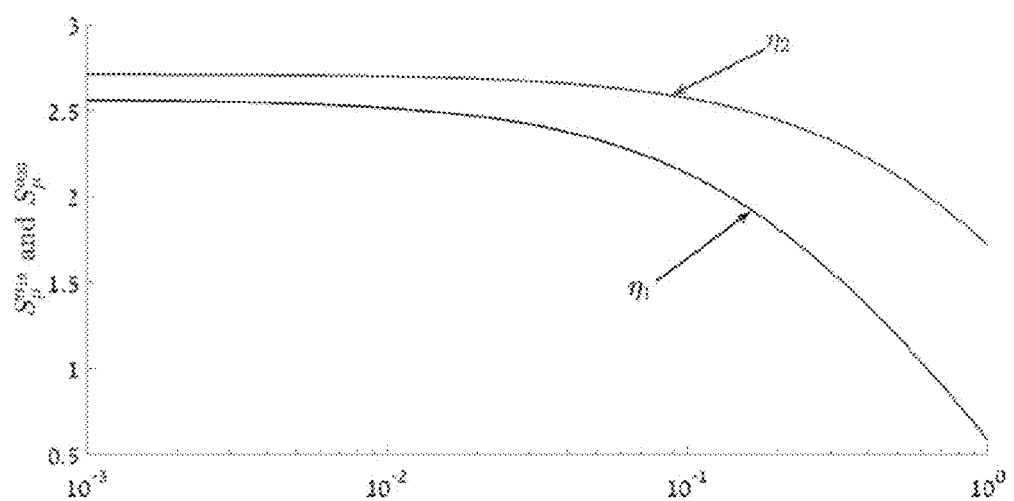
Figures 16A, 16B:
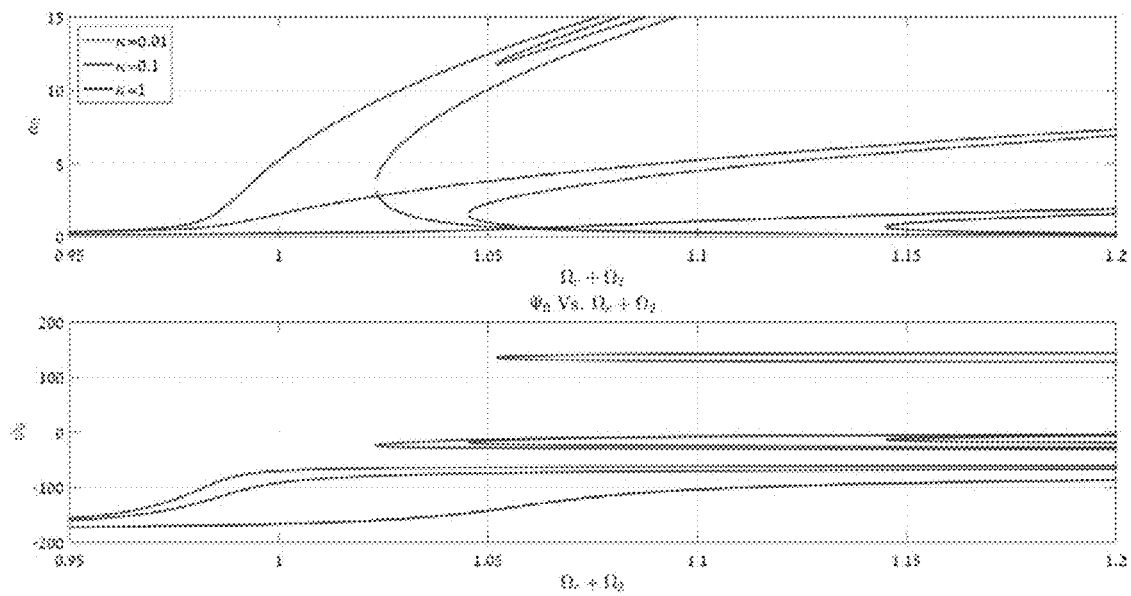
Figure 25:
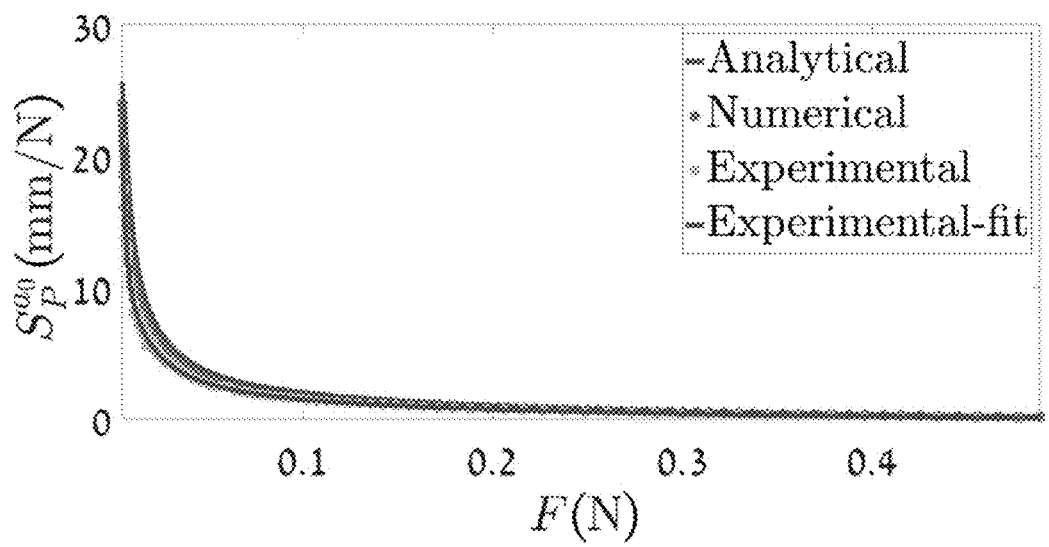
Figure 26:
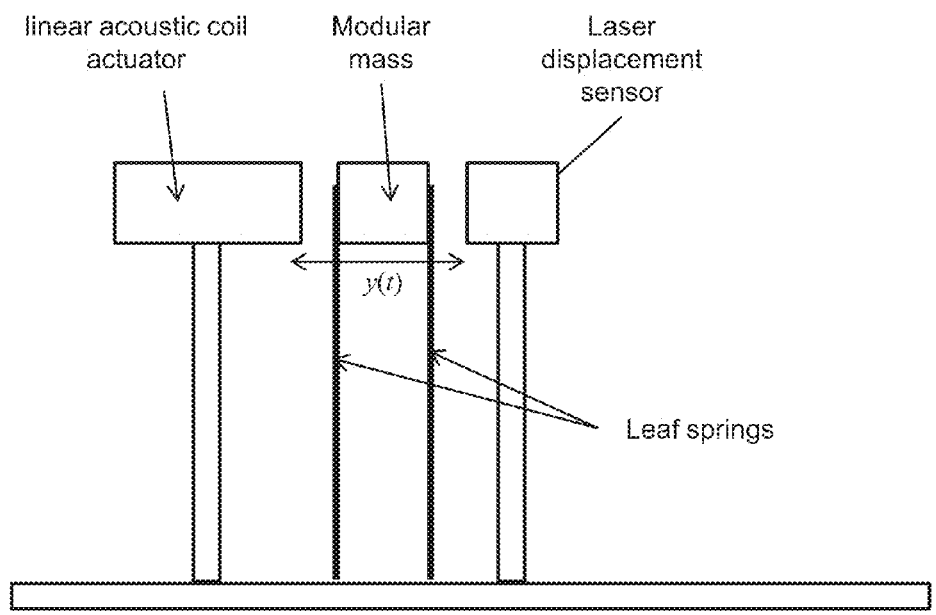

FIGS. 12A and 12B show a gain of a single degree-of-freedom parametric amplifier as a function of amplitude and phase of an external force, as obtained by calculations performed according to some embodiments of the present invention;

FIG. 13 shows relation between amplitude sensitivity to a change in the external force amplitude of a single degree-of-freedom parametric amplifier working above linear instability threshold and amplitude and phase of an external force, as obtained by calculations performed according to some embodiments of the present invention;

FIGS. 14A and 14B are exemplified maps in a parameter space, showing amplitude insensitive regions and phase insensitive regions, as obtained by calculations performed according to some embodiments of the present invention;

FIGS. 15A and 15B show responses (FIG. 15A) and sensitivities (FIG. 15B) of a two degree-of-freedom parametric amplifier, as obtained by calculations performed according to some embodiments of the present invention;

FIGS. 16A and 16B show the effect of a limiter component on the output of the system, according to some embodiments of the present invention;

FIGS. 17A-C illustrate a procedure suitable for identifying an angular location of a rotation imbalance, according to some embodiments of the present invention;

FIGS. 18A-B show nonlinear frequency response of a dual-frequency parametric amplifier, as obtained experimentally according to some embodiments of the present invention;

FIG. 19 shows a gain G of a dual-frequency parametric amplifier for a derived nonlinear frequency response, as obtained experimentally according to some embodiments of the present invention;

FIGS. 20A-B show amplitudes near a natural frequency (FIG. 20A) and at a direct excitation frequency (FIG. 20B) as a function of a direct excitation phase, as obtained experimentally according to some embodiments of the present invention;

FIGS. 21A and 21B show amplitudes near a natural frequency (FIG. 21A) and at a direct excitation frequency (FIG. 21B), as a function of a direct excitation amplitude F, as obtained experimentally according to some embodiments of the present invention;

FIG. 22 shows a gain as computed according to some embodiments of the present invention from the experimental results shown in FIGS. 21A and 24A;

FIG. 23 shows amplitude sensitivity near a natural frequency to variations in a direct excitation amplitude, as obtained numerically and experimentally according to some embodiments of the present invention, using a set of parameters;

FIGS. 24A-B show amplitudes near the natural frequency (FIG. 24A) and at the direct excitation frequency (FIG. 24B) as a function of a direct excitation amplitude F, as obtained numerically and experimentally according to some embodiments of the present invention, using another set of parameters;

FIG. 25 shows amplitude sensitivity near a natural frequency to variations in a direct excitation amplitude, as obtained numerically and experimentally according to some embodiments of the present invention, using another set of parameters; and FIG. 26 shows an experimental setup used in experiments performed according to some embodiments of the present invention.

DESCRIPTION OF SPECIFIC EMBODIMENTS OF THE INVENTION

The present invention, in some embodiments thereof, relates to amplification and, more particularly, but not exclusively, to a method and a system for parametric amplification.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
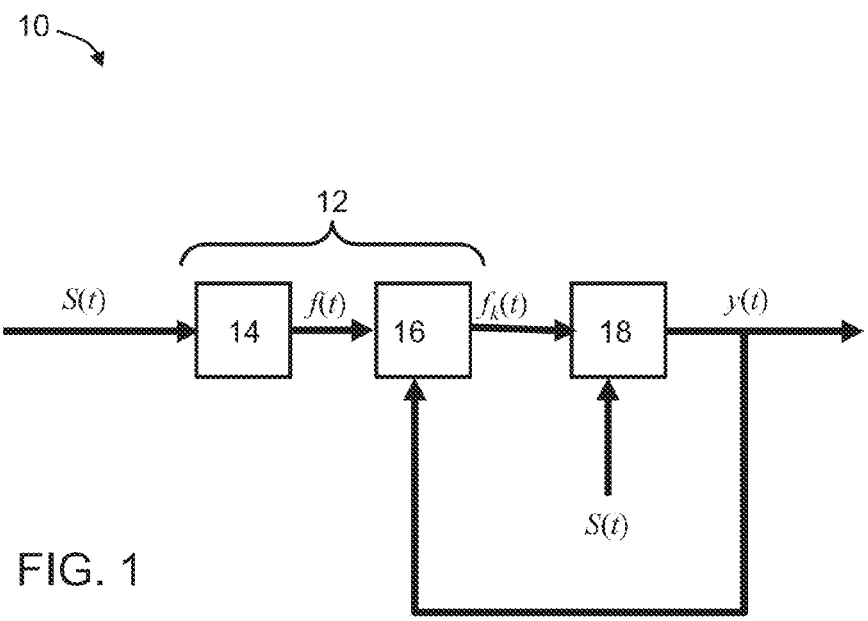

Referring now to the drawings, FIG. 1 is a schematic illustration of a system 10 suitable for converting an input oscillation S(t) having an input frequency $\omega_r$ into an output oscillation y(t) having at least one output containing a frequency $\omega_n$, according to some embodiments of the present invention.

Herein, frequencies are described in their angular representation, namely in units of angle per unit time (e.g., radians per second, abbreviated $s^{-1}$). The conversion to a cycle representation, namely in units of a number of cycles per unit time (e.g., Hz) is known and can be formulated, for example, as $\omega=2\pi\nu$, where $\nu$ is the frequency in Hz and $\omega$ is the frequency in radians per second.

Without loss of generality, S(t) and y(t) are expressed below as sinusoidal oscillations. However, it is to be understood the principles described below are applicable also to complex oscillations, for example, by decomposing the oscillation to a Fourier series, and applying the technique of the present embodiments to one or more elements of the Fourier series.

The input and output oscillations are oscillations of an observable and measurable physical quantity, which can be mechanical, electrical, magnetic or electromagnetic. For example, the input and output oscillations can be oscillations in displacement or torsion of one or more massive objects, oscillations in magnitude and/or direction of an electrical field vector, oscillations of an electrical potential or voltage, oscillations in magnitude and/or direction of a magnetic field, oscillations in magnitude and/or direction of an electromagnetic field (e.g., an optical field, a radiofrequency field), acoustic oscillations (e.g., sonic or ultrasonic oscillations), and the like.

In various exemplary embodiments of the invention the input and output oscillations are of the same type (e.g., both being mechanical oscillations, or both being electrical oscillations, or both being magnetic oscillations, or both being electromagnetic oscillations). However, this need not necessarily be the case, since, for some applications, it may not be necessary for the input and output oscillations to be of the same type. For example, the input oscillation can be electrical oscillation and the output oscillation can be mechanical, or vice versa.

System 10 comprises a controller 12 that receives the input oscillation S(t) and responsively generates a drive signal $f_k(t)$. Controller 12 can include a circuit configured for generating the signal. Optionally and preferably controller 12 has digital computer capabilities for calculating the parameters of the generated signal. Alternatively, controller 12 can communicate with an external data processor (not shown) that calculates the parameters of the signal and transmits them to controller 12.

Controller 12 optionally and preferably represents the input oscillation as an electrical or optical oscillatory signal f(t), before generating the drive signal. In these embodiments, controller 12 comprises an oscillation conversion circuit 14 that converts the oscillations into an electrical or optical signal f(t), and a drive signal generation circuit 16 that receives the signal f(t) and generates the drive signal $f_k(t)$. When the input oscillation S(t) is electrical or optical, controller 12 may generates the drive signal $f_k(t)$ without converting S(t) into f(t).

System 10 further comprises an oscillator 18 that oscillates according to drive signal $f_k(t)$. Oscillator 18 can be a single-degree-of-freedom system having a single natural oscillation frequency, or a multi-degree-of-freedom system having a plurality of natural oscillation frequencies. The natural oscillation frequency or frequencies of oscillator 18 are collectively denoted $\omega_n^{(j)}$, where j is a positive integer. When oscillator 18 has a single natural oscillation frequency, the superscript j can be understood as representing a specific number (e.g., j=1). When oscillator 18 has a plurality of natural oscillation frequencies, j can be a running index (e.g., j=1, 2, ... ).

The oscillations of oscillator 18 are referred to as pump oscillations. In various exemplary embodiments of the invention oscillator 18 applies parametric excitation at the pump oscillations to the input oscillation S(t), to provide the output oscillation y(t). In these embodiments, the input oscillation S(t), the pump oscillations and the output oscillation y(t) are all of the same type. For example, when S(t) represents mechanical oscillation of a massive body, the pump oscillations of oscillator 18 can be mechanical oscillations (e.g., an oscillatory mechanical force applied to the massive body). Thus, in this example, the massive body's dynamics is a combination of the mechanical pump oscillations with the input oscillation. When S(t) represents a non-mechanical oscillation (e.g., an oscillatory current or voltage or electromagnetic field), oscillator 18 can include a circuit that generates non-mechanical oscillations of the same type as the input. In these embodiments, the input oscillation can be parametrically excited at the pump oscillation by an electronic circuit such as, but not limited to, a mixer, as known in the art.

In some embodiments, the input oscillation S(t) are of different type than the oscillations generated by oscillator 18. In these embodiments, system 10 converts input oscillation S(t) before it is excited at the pump oscillations. The conversion is preferably into the same type as the pump oscillations, and can be done using any technique known in the art for converting one type of oscillations into another type of oscillations. For example, conversion between electrical oscillations and mechanical oscillations can be by means an electromechanical element, and conversion between electrical oscillations and optical oscillations can be by means an electro-optical element.

In various exemplary embodiments of the invention drive signal $f_k(t)$ is a multi-component signal, wherein at least several of its components are oscillatory. The frequencies, amplitudes and phases of the components of $f_k(t)$ are denoted by $\omega$, $\gamma$ and $\phi$ respectively, and are labeled by subscript indices "a", "b", "c" etc., to distinguish between the notation of one component and the other. Thus, a first component of $f_k(t)$ has a frequency $\omega_a$, amplitude $\gamma_a$ and phase $\phi_a$; a second component of $f_k(t)$ has a frequency $\omega_b$, amplitude $\gamma_b$ and phase $\phi_b$, and so on.

Preferably, a frequency of at least one component of drive signal $f_k(t)$ is other than two times of one or more of the natural frequencies of oscillator 18 (e.g., the jth natural frequency $\omega_n^{(j)}$ of oscillator 18), more preferably other than two times of any one of the natural frequencies of oscillator 18 (e.g., any of $\omega_n^{(1)}$, $\omega_n^{(2)}$, etc.). More preferably, but not necessarily, a frequency of at least one component of drive signal $f_k(t)$ is other than any integer multiplication of one or more of the natural frequencies of oscillator 18, or other than any integer multiplication of any one of the natural frequencies of oscillator 18. Thus, these component(s) contributes to non-degenerate parametric amplification, since their frequency is not two-times one of the natural frequencies $\omega_n^{(j)}$. In some embodiments of the present invention none of the components of the drive signal $f_k(t)$ has a frequency that is an integer multiplication of the input frequency $\omega_r$. In other words, the present embodiments contemplate a multi-component drive signal $f_k(t)$ of which $\omega_i/\omega_r$ is non-integer for any i∈{a, b, c, ... }.

Further preferably, the frequency of at least one other component of drive signal $f_k(t)$ approximately equals two times one of the natural frequencies of oscillator 18 (e.g., the jth natural frequency $\omega_n^{(j)}$ of oscillator 18). It was found by the present inventors that a multi-component signal having a frequency that differs from $\omega$, and also a frequency that equals about $2\omega_n^{(j)}$ is advantageous because it allows both, tuning to amplify any frequency and obtaining relatively high gain. This is unlike traditional parametric amplifiers that either allow frequency conversion (in case of non-degenerate parametric amplification) or provide a relatively high gain (in case of degenerate parametric amplification).

The oscillation parameters of the component of $f_k(t)$ that has a frequency that equals about $2\omega_n^{(j)}$ are labeled herein by the subscript index "a" and the oscillation parameters of the other component(s) of $f_k(t)$ are labeled herein by the subscript indices "b", "c", etc. Thus, according to various exemplary embodiments of the present invention $\omega_a \approx 2\omega_n^{(j)}$ and $\omega_b \neq \omega_r$.

The present inventors found that it is advantageous to select $\omega_b$ such that $|\omega_n^{(j)} \pm \omega_b| \approx \omega_r$. Thus, for example, $\omega_b$ can be set to be about $\omega_n^{(j)} + \omega_r$ or about $\omega_n^{(j)} - \omega_r$. When $f_k(t)$ includes three or more components, the frequency $\omega_a$ can be set to be about $2\omega_n^{(j)}$, the frequency $\omega_b$ can be set to be about $\omega_n^{(j)} + \omega_r$, and the frequency $\omega_c$ can be set to be about $\omega_n^{(j)} - \omega_r$. Other combination of frequencies, such as, but not limited to, $|n\omega_r \pm k\omega_n^{(j)}|$, where n and k are integers, are also contemplated.

In various exemplary embodiments of the invention $\omega_n^{(j)}$ is larger than $\omega_r$, so that system 10 provides frequency up-conversion. Preferably $\omega_n^{(j)}$ is at least X times larger than $\omega_r$, where X is about 2 or about 3 or about 10 or about 100 or about 1000.

According to some embodiments of the present invention, drive signal comprises an amplitude limiter component $f_{lim}$. The amplitude limiter component preferably varies synchronously and nonlinearly with the output oscillation y(t). In these embodiments, controller 12 receives a feedback from the output oscillation, so as to allow controller 12 to synchronize the drive signal with the output oscillations. In some embodiments of the present invention the amplitude limiter component $f_{lim}$ is proportional to the cubic power of y(t). In these embodiments, $f_{lim}$ can be written as $sy^3$, where s is a predetermined coefficient. Other non-linear forms for the amplitude limiter component are also contemplated.

The amplitudes and phases of the components of the drive signal are preferably selected by controller 12 in accordance with the desired characteristic of the output y(t). Thus, for example, the amplitudes and phases can be selected so as to amplify the input oscillation by a predetermined gain value G that is optionally and preferably fed into controller 12, in some embodiments the amplitudes and phases are selected to achieve a predetermined sensitivity of the output oscillation to a change in the input oscillation, and in some embodiments the amplitudes and phases are selected to become more sensitive to the input signal's phase, thus enhancing its accurate identification.

The amplitude limiter component $f_{lim}$ is optionally and preferably selected by controller 12 such as to limit the amplifier output. Alternatively, the limiter component can be ensured using a suitable passive element. The advantage of having a limiter component is that it avoids excessive stress while providing the desired amplification. The effect of $f_{lim}$ on y(t) for the case in which the amplitude limiter component is proportional to the cubic power of y(t), is shown in FIGS. 16A and 16B. In FIGS. 16A and 16B, κ is a dimensionless parameter that is linearly proportional to s.

Figure 2:
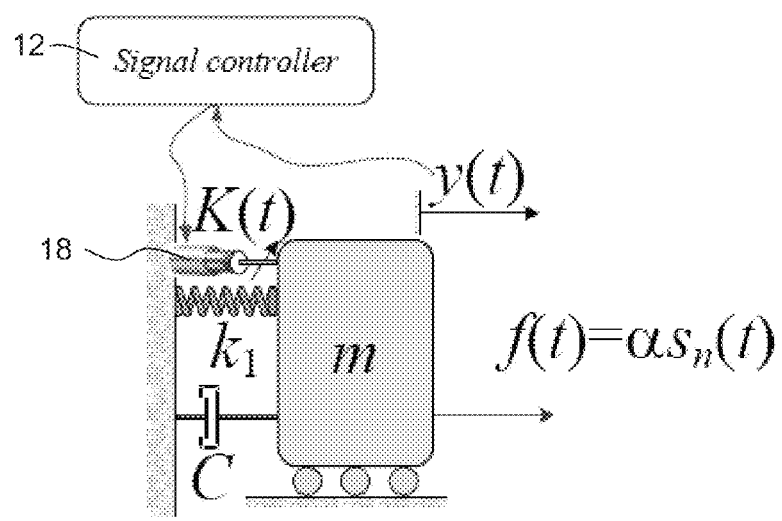

Following is a representative example of an implementation of the technique of the present embodiments. In this example, the technique is used for converting an oscillatory signal f(t), describing an oscillation S(t), at frequency $\omega_r$ and phase $\phi_r$. Without loss of generality, the relation between the oscillation and the oscillatory signal that represents the oscillation is expressed as $f(t)=\alpha S(t)$. The present example is described in terms of oscillation of a massive body, as illustrated in FIG. 2. The ordinarily skilled person would have no difficulty in adjusting this example to other types of oscillations.

In the present example, the drive signal generated by controller 12 includes a component having amplitude $\gamma_a$, phase co, and frequency $\omega_a \approx 2\omega_n$, a component having amplitude $\gamma_b$, phase $\phi_b$, and frequency $\omega_b \approx \omega_n + \omega_r$, and an amplitude limiter component $f_{lim}$ satisfying $f_{lim} = -sy^3$.

The pump oscillations generated by oscillator 18 are represented by the time varying stiffness K(t) in FIG. 2. It was found by the present inventors that with such drive signal, the output oscillation has a frequency component which is about $\omega_n$ with amplitude Y and an additional frequency component $\omega_r$ with amplitude $2\Lambda$, where $\Lambda$ can be written as $\alpha S_0/[2m(\omega_n^2-\omega_r^2)]$, $\alpha S_0$ being the amplitude of the input signal f(t), and where Y and $\Lambda$ satisfy the relation:

$$Y = -\frac{2\gamma_b \sin(\psi_0 + \varphi_b + \varphi_r)}{4\zeta + \gamma_a \sin(2\psi_0 + \varphi_a)} \varepsilon \Lambda$$

where $\zeta$ is defined as $C/2\varepsilon m\omega_n$, C being the damping coefficient of the input oscillation, $\varepsilon$ is a sufficiently small dimensionless parameter (e.g., $\varepsilon<0.1$ or $\varepsilon<0.01$), and $\psi_0$ is the phase of the output oscillation at frequency $\omega_n$, which can be computed numerically.

The gain provided by system 10 can be expressed as $|Y|/|2\Lambda|$. When $\omega_n$ is larger than $\omega_r$, high gain can be obtained. When a predetermined gain value G is desired, the parameters $\gamma_b$, $\phi_b$, $\phi_r$, and $\gamma_a$ can be selected such that the ratio $|Y|/|2\Lambda|$ and G are approximately equal to each other.

The sensitivity of system 10 can be defined as $\partial Y/\partial(\alpha S_0)$. When a predetermined sensitivity value $\Delta$ is desired, the parameters $\gamma_b$, $\phi_b$, $\phi_r$, and $\gamma_a$ can be selected such that the expression $\partial Y/\partial(\alpha S_0)$ and $\Delta$ are approximately equal to each other.

Following is a representative example of an implementation of the technique of the present embodiments for massive structures in which the mass is distributed in space, for example, along an axis.

Figure 3:
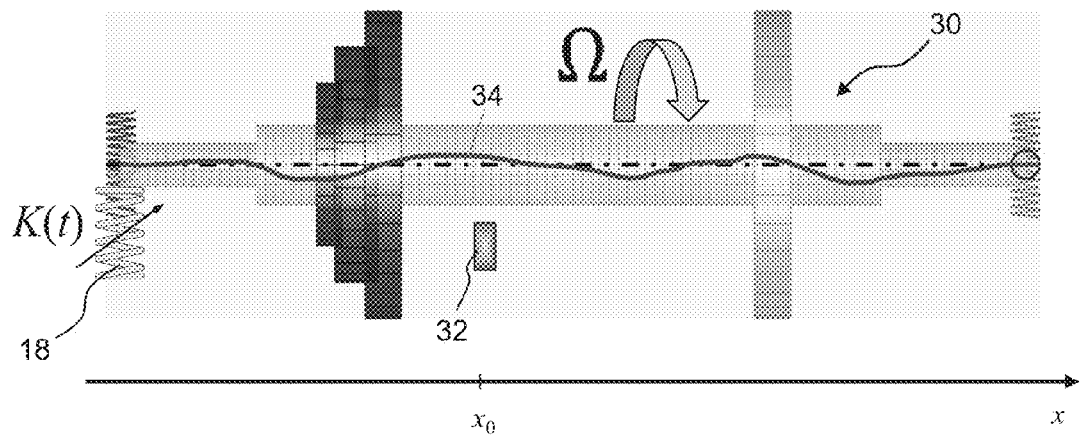

FIG. 3 shows an oscillating massive structure 30. The mass of structure 30 is distributed in space, particularly along a direction parallel to the x axis. The force caused by the deviation of mass center along the structure, $\varepsilon(x)$, from the axis of rotation of structure 30 can be expressed as $Q(x,t)=\varepsilon(x)\sin \omega_r t$, where $\varepsilon(x)$ is a complex ($\varepsilon(x)=\varepsilon_u(x)+i\varepsilon_v(x)$) x-dependent function illustrated as a thick line 34 in FIG. 3. A sensor 32 measures the displacement of structure 30 at location $x=x_0$.

The response S(t) measured by sensor 32 can be expressed as a weighted summation of structural deformation shapes (e.g., eigenvectors, or mode-shapes):

$$S(t) = u(x_0, t) = \sum_{j=1}^{\infty} \psi_j(x_0) \eta_j(t)$$

where $\eta_j$ are modal coordinates corresponding to different linear combinations of displacements in a direction perpendicular to the x axis. Both $\eta_j$, and $\psi_j$ are associated with a natural frequency $\omega_n^{(j)}$.

When the excitation Q(x,t) contains relatively low frequencies, only low-frequency related modes are significant in S(t). This situation is typical when structure 30 is slowly rotating on a mandrel parallel to the x axis so that an external force is generated on structure 30 due to mass imbalance. This situation can be expressed as:

$$S(t) = u(x_0, t) = \sum_{j=1}^{\infty} \psi_j(x_0) \eta_j(t) + \alpha \sum_{j=N+1}^{\infty} \psi_j(x_0) \eta_j(t) + \text{noise}$$

where α is a parameter that is much smaller than 1, more preferably smaller than 0.5, more preferably smaller than 0.1, more preferably smaller than 0.01.

The technique of the present embodiments can be used to determine the projection of Q(x,t) on higher frequency modes, $\psi_j(x_0)$, $j>N+1$. Mathematically, this can be expressed as $\langle \psi_j(x_0), Q(x,t) \rangle$, where (•,•) represents and inner product of two vector or functions producing the projection.

According to some embodiments of the present invention an output oscillation $\omega_n^{(j)}$, where $j>N+1$, is selected and a drive signal is generated to convert the input oscillation at $\omega_r$ into output oscillation $\omega_n^{(j)}$, such as to achieve gain G and phase $\omega_j$ as further detailed hereinabove. Since Q(x,t) is complex, it contains the phase information due to $\varepsilon(X)=\varepsilon_u(x)+i\varepsilon(x)$ being a 3-dimensional line. The tunable phases $\phi_a$, $\phi_b$ of the drive signal affect the gain G, the sensitivity of gain and phase $\phi_j$ of the signal component at $\omega_n^{(j)}$. The present embodiments thus allow identification and/or detection enhancement of the amplitude and/or phase at $\omega_r$.

It was found by the present inventors that such a procedure provides output oscillation having amplitude Y that is approximately G times larger than the real part or the imaginary part or the absolute value of the inner product $\langle\psi_j(x_0), Q(x,t)\rangle$, thus enabling to better assess $\langle\psi_j(x_0), Q(x,t)\rangle$. In some embodiments, the pump oscillation is selected such that the phase indicates the value of $\theta_0=\arg(\langle\psi_j(x_0),Q(x,t)\rangle)$ which is the effective angle of the mass imbalance associated with the jth resonance.

A mathematical description that explains the above results is provided in the Examples section that follows.

Implementations for massive structures in which the mass is distributed in space are useful for many applications, including, without limitation, filtering of distributed phenomena, sensors, balancing of rotating structures and the like.

Following is a representative example of an implementation of the technique of the present embodiments for balancing a rotating body.

Rotating structures oftentimes suffer from forces due to imperfect alignment of center of mass with the axis of rotation. As a result, when the rotating structure rotates at an angular frequency close to one of its natural frequencies, resonance conditions occur and high response levels begin to develop. The present inventors realized that it is oftentimes difficult to balance a rotating structure using a traditional mass balancing machines because the natural frequencies relating to flexural modes are typically much higher than the frequencies that are available in such traditional machines. The present embodiments successfully provides a technique that can be used for balancing a rotating structure even when the structure is not rotated at angular frequency that is close to one of its natural frequencies.

Figure 4:
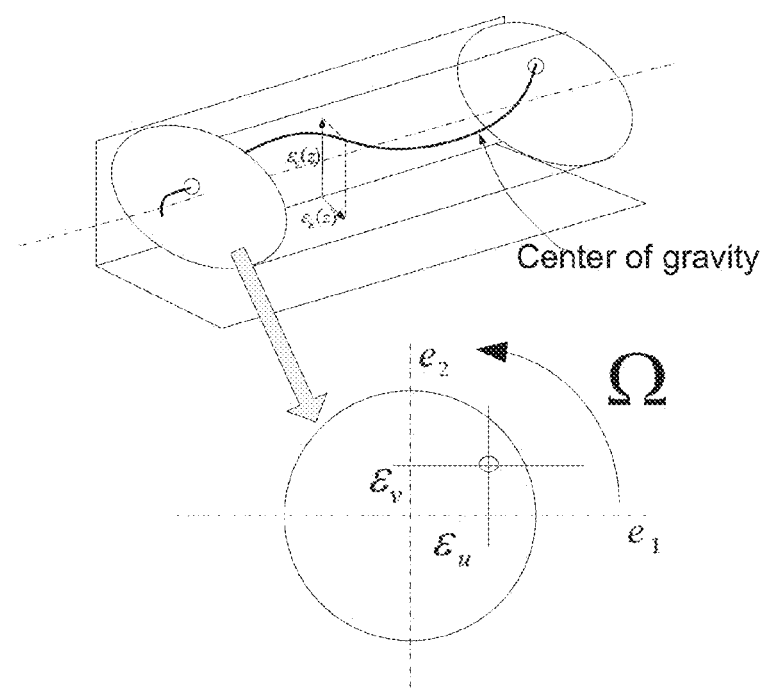

FIG. 4 is a schematic illustration describing location of the center of gravity of along a structure as a continuous curve as a function of the x coordinate. The distributed imbalance is often described in a complex form:

$$\varepsilon(x)=\varepsilon_u(x)+i\varepsilon_v(x)$$

During rotation at an angular speed $\Omega$ the force per unit length due to the imbalance can be written as:

$$U(x,t)=\Omega^2 m\varepsilon(x)e^{i\Omega t}$$

Where m is the mass per unit length of the structure and $m\varepsilon(x)$ is defined as the mass imbalance per unit length. The projection of the imbalance force on the mode $\psi_j(x)$, can be written as:

$$U_j(t) = \langle\psi_j(x), U(x,t)\rangle = \int_0^L \Omega^2\psi_j(x)\varepsilon(x)e^{i\Omega t}dx$$

where L is the length of the structure. The technique of the present embodiments can be used to determine $U_0$, $\theta_0$, such that $U_j(t)=U_0\exp[i(\theta_0+\Omega t)]$. A correcting mass $m_c$ can then be mounted on the structure at radius $r_c$ and angle $\theta_c$ such that the combined effect on mode j is zero or close to zero (e.g., less than 0.1 or less 0.05 of the original oscillation amplitudes):

$$U_j(t)+U_c(t)=\langle\psi_j(x),U(x,t)+m_c r_c e^{i(\Omega t+\theta_c)}\rangle\approx 0$$

Figure 5A:
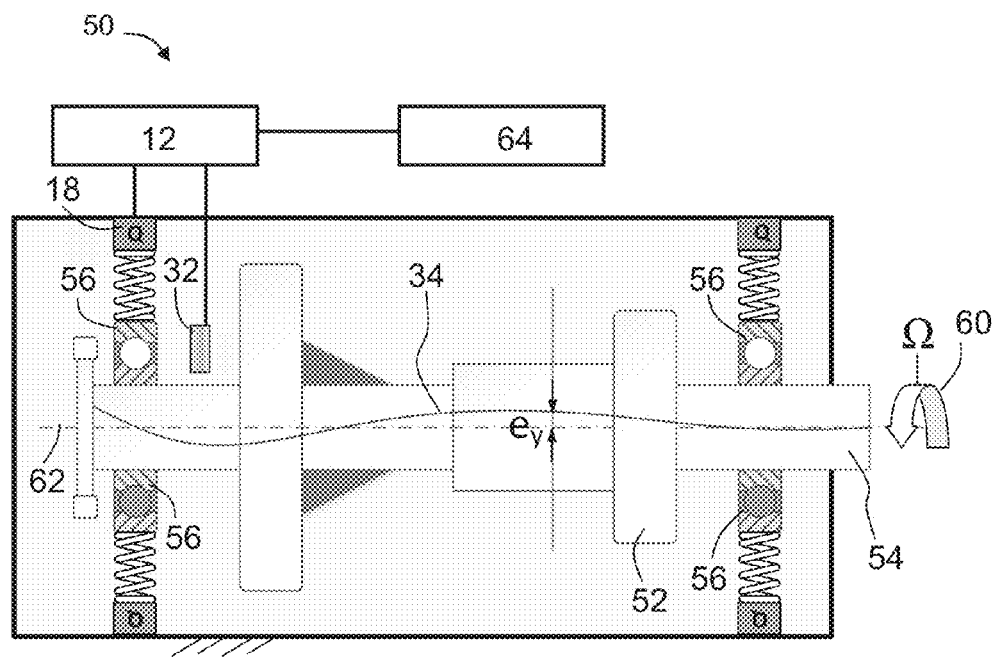
Figure 5B:
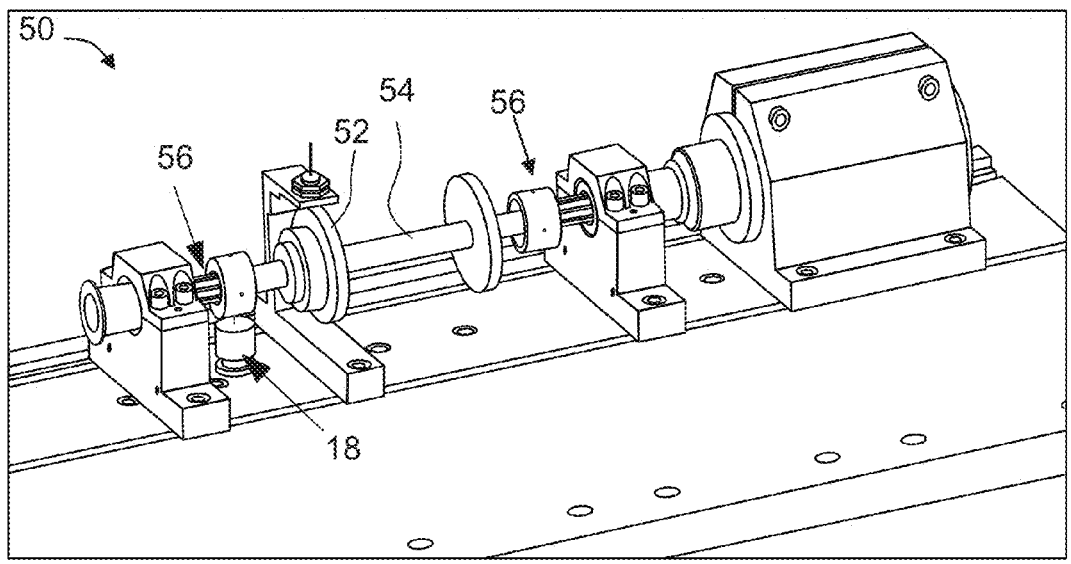

FIGS. 5A and 5B are schematic illustrations of a cross-sectional view (FIG. 5A) and isometric view (FIG. 5B) of a system 50 suitable for balancing a rotating structure 52, according to some embodiments of the present invention. System 50 comprises a rotatable mandrel 54 constituted for rotating 60 structure 52, about an axis 62. Mandrel 54 is suspended on one or more suspension members 56, which are preferably elastic so as to facilitate their oscillation. Mandrel 54 can also be part of structure 52. During the rotation of structure 53 there is a rotation imbalance, shown by line 34 that illustrates the x-dependence amplitude of the displacement $\varepsilon_v$ along axis 62.

System 50 further comprises sensor 32 which in the present embodiments serves as a rotation imbalance sensor 32. Sensor 32 senses the rotation imbalance of structure 52 during the rotation, and generates a signal that describes the sensed rotation imbalance.

Controller 12 (not shown in FIG. 5B) receives the signal from sensor 32 and oscillates suspension member 56. Preferably, controller transmits a drive signal to oscillator 18, which generates oscillations in member 56. The drive signal generated by controller is optionally and preferably a multi-component drive signal, as further detailed hereinabove, except that the aforementioned input oscillation signal f(t) is enacted by the rotation imbalance signal received from sensor 32. The oscillation of member 56 is optionally and preferably perpendicular to axis 62, and it can be linear or along a curved line (e.g., circular or elliptic). System 50 optionally and preferably also comprises a display 64 that displays data indicative of the signals generated by sensor 34. Display 64 optionally and preferably is also controlled by controller 12.

In use, mandrel 54 is rotated with structure 52, and the rotation imbalance signal is generated by sensor 32. Preferably, the rotation speed $\Omega$ is X times slower than the characteristic resonance rotation speed of structure 52, where X is at least 2 or at least 10 or at least 100.

A multi-component drive signal is generated by controller 12 responsively to the signal from sensor 32, wherein a frequency of at least one component of the drive signal is other than two times the frequency of the rotation imbalance signal. For example, the signal due to imbalance can be projected on each of the jth oscillation modes and a corrective mass can be applied. Once the projection on mode j is corrected, rotation at this frequency can be effected without exhibiting large oscillations.

Mandrel 54 can be oscillated, perpendicularly to axis 62, according to drive signal, to establish a simultaneous rotary and oscillatory motion for mandrel 54 (rotary about axis 62 and oscillatory perpendicular to axis 62). During the simultaneous rotary and oscillatory motion, rotation imbalance is sensed by sensor 32 and is optionally and preferably displayed on display 64. Structure 52 is then balanced, for example, by adding a mass $m_c$ at a distance $r_c$ from axis 62 and angle $\theta_0$ about axis 62. The procedure can be repeated until a predetermined stopping criterion is reached. Typically the stopping criterion is that the amplitude of the sensed rotation imbalance is less than a predetermined threshold.

As explained above and mathematically proven in the Examples section that follows, the drive signal generated by controller 12 amplifies the rotation imbalance as if the rotation speed was the characteristic resonance speed of structure 52. Thus, balancing process described above prevents or reduces development of resonant response levels even when the structure 52 is rotated at or close to its resonant rotation speed.

In addition or as an alternative to the amplification of the amplitude of the force due to the imbalance, as further detailed hereinabove, the present embodiments contemplate a technique suitable for increasing the sensitivity to the angular location of the imbalance. This is optionally and preferably achieved by tuning the phase of one or more components of the drive signal. In a preferred embodiment, the phase is varied until minimal oscillation amplitude is obtained. The angular location of the imbalance can then be set to be the phase at which the minimal amplitude is obtained, and the corrective mass can be placed at that angular location.

Figure 6:
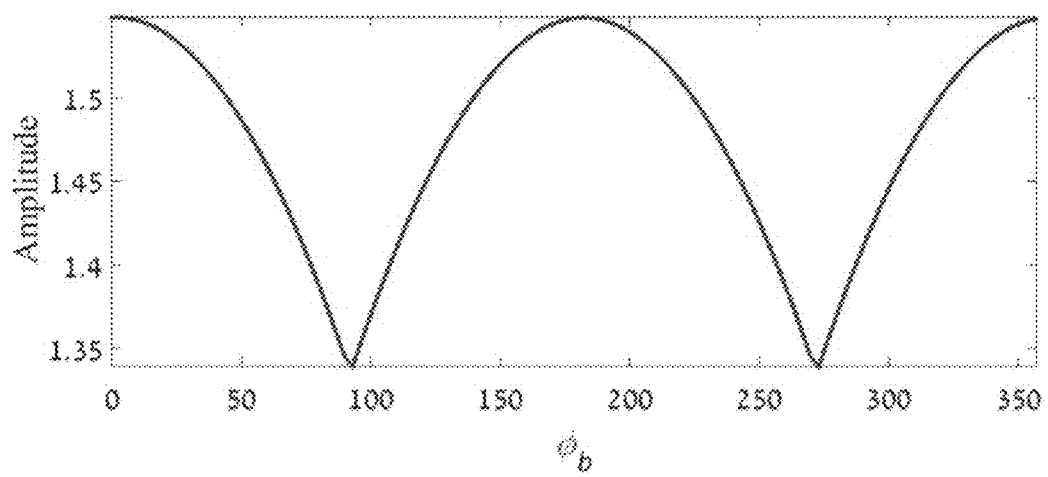

FIG. 6 is a graph showing the amplitude of the oscillation as a function of the phase of one component of the drive signal (the component $\omega_b = \omega_n + \omega_r$, in the present example). As shown, amplitude minima are identifiable, and the phase of the respective component can be set to equal one of the phases at which minima are obtained. A representative example of a procedure suitable for identifying the angular location of the imbalance is provided in the Examples section that follows.

Thus, the technique of the present embodiments enables amplification of the amplitude of the force due to the imbalance, and increment of the sensitivity to the angular location of the imbalance. Preferably, the balancing process described above is performed repeatedly, wherein in each balancing stage the parameters of the parametric excitation alternate between an excitation that amplifies the amplitude of the force, and an excitation that increase the sensitivity to the angular location of the imbalance.

Unless otherwise defined, the terms "about" and "approximately," and the mathematical symbol "≈", as used herein, refer to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The present example describes a tunable parametric amplifier (PA) with a hardening, Duffing-type nonlinearity. The PA differs from traditional parametric amplifiers because it frees the amplified signal frequencies from being an integer multiple of the natural frequency, as commonly assumed under parametric resonance.

The PA of the present example diverts some of the amplified signal's energy to any chosen natural frequency of a distributed or multi-degree of freedom (MDOF) system, while preserving the parametric resonance's superior output-signal amplitudes. The present Inventors successfully tuned the parameters of the PA to effectively find the projection of low frequency distributed excitation on high frequency related eigenvectors. It was found that such a projection allowed performing temporal and spatial filtering while maintaining the parametric resonance's amplification.

The PA of the present embodiments can be used to identify the effect of imbalance in rotating structures on high frequency critical speeds, while rotating the structure at low speeds. This allows eliminating potential sources of excitation causing excessive vibration with safe procedures that do not require to rotate the system at fast and dangerous speeds. Mathematical Derivation Two configurations of PA are investigated in this Example. A single degree-of-freedom (SDOF) PA, and a multi-degree of freedom (MDOF) PA. For both configurations the method of multiple scales, found in A. H. Nayfeh, D. T. Mook, Nonlinear oscillations, John Wiley & Sons (2008), is employed.

Parametric Amplifier with a Single Degree of Freedom

Consider an oscillator as illustrated in FIG. 2 that subjected to a slow harmonic force, representing the signal to be amplified, $f(t)=F \cos(\omega_r t+\phi_r)$, and is characterized by a linear dashpot damper, C, mass object, m, and time varying nonlinear restoring force:

$$f_k = -k_1(1+\alpha_a \cos(\omega_a t+\phi_a)+\alpha_b \cos(\omega_b t+\phi_b))y-sy^3 \quad (1)$$

The PA is mathematically analyzed to determine the values of $\alpha_a$, $\omega_a$, $\alpha_b$ and $\omega_b$ that lead to response levels sufficiently above the noise floor, keeping it related to $f(t)$, and to achieve sufficiently high sensitivity of the response (the output of the PA) to changes in the input $f(t)$. High amplification leads to better identification of $f(t)$ by increasing the useful signal to noise level.

Under the aforementioned forces, the following equation of motion (EOM) is obtained:

$$m\ddot{y}+C\dot{y}+k(1+\alpha_a \cos(\omega_a t+\phi_a)+\alpha_b \cos(\omega_b t+\phi_b))y+sy^3=F \cos(\omega_r t+\phi_r), \quad (2)$$

where a dot above a symbol denotes a time-derivative, and two dot above a symbol denote a second time-derivative.

The former is transformed into dimensionless form:

$$\ddot{y}+\zeta_t\dot{y}+(1+\alpha_a \cos(\Omega_a \tau+\phi_a)+\alpha_b \cos(\Omega_b \tau+\phi_b))y+\kappa_t y^3 = p_t \cos(\Omega_r \tau+\phi_r) \quad (3)$$

where $\zeta_t=C/2m\omega_n$, $\kappa_t=s/m\omega_n^2$, $p_t=F/m\omega_n^2$, $\Omega_i=\omega_i/\omega_n$, the dimensionless natural frequency is $\omega=(k/m)^{1/2}$ and the dimensionless time is defined as $\tau=\omega_n t$. The external force frequency is low, therefore $\Omega_r<<1$, and the linearized, dimensionless natural frequency of the PA is 1. Approximated solutions of EQ. (3) can be obtained for small but finite amplitudes, thus one puts:

$$y=\epsilon x \quad (4)$$

where $\epsilon<<1$ is some measure of the amplitude. Substituting EQ. (4) into EQ. (3) yields:

$$\ddot{x}+x=P \cos(\Omega_r \tau+\phi_r)-\epsilon(\zeta \dot{x}+(\gamma_a \cos(\Omega_a \tau+\phi_a)+\gamma_b \cos(\Omega_b \tau+\phi_b))x+\kappa x^3) \quad (5)$$

where $\zeta=\zeta_t/\epsilon$, $\alpha_{1,2}=\epsilon\gamma_{1,2}$, $P=p_t/\epsilon$ and $\kappa=\epsilon\kappa_t$.

Applying the method of multiple scales, the solutions of EQ. (5) can be approximated as follows:

$$x(\tau)=(\tau_0,\tau_1)+\epsilon x_1(\tau_0,\tau_1) \quad (6)$$

where the time scales are defined by $\tau_i=\epsilon^i \tau$, $i=0,1$.

Substituting EQ. (6) into EQ. (5) and collecting terms of the same order in $\epsilon$ yields:

$\epsilon^0$:

$$D_0^2 x_0+x_0=P \cos(\Omega_r \tau+\phi_r) \quad (7)$$

$\epsilon^1$:

$$D_0^2 x_1+x_1=-2\zeta D_0 x_0-(\gamma_a \cos(\Omega_a \tau+\phi_a)+\gamma_b \cos(\Omega_b \tau+\phi_b))x_0-\kappa x_0^3-2D_0 D_1 x_0 \quad (8)$$

In EQs. 8 and 9, $D_i$ denotes differentiation with respect to $\tau_i$, namely $D_i \equiv \partial/\partial \tau_i$.

The zero order solution can thus be written as a combination of two frequency terms:

$$x_0=A e^{i\tau_0}+\Lambda e^{i(\Omega_r \tau_0+\phi_r)}+CC \quad (9)$$

where CC denotes the complex conjugate of the preceding terms.

Substituting $x_0$ into EQ. (8) yields:

$$D_0^2 x_1 + x_1 =$$
$$-(2i\zeta A + 2iA' + 3\kappa A^2 \overline{A} + 6\kappa A\Lambda^2)e^{i\tau_0} - (i2\zeta\Omega_r \Lambda + 6\kappa \overline{A}A\Lambda + 3\kappa\Lambda^3)$$
$$e^{i(\Omega_r \tau_0+\varphi_r)} - \frac{\gamma_a}{2}(\Lambda e^{i((\Omega_a+1)\tau_0+\varphi_a)} + \overline{A}e^{i((\Omega_a-1)\tau_0+\varphi_a)} +$$
$$\Lambda e^{i((\Omega_a+\Omega_r)\tau_0+\varphi_a+\varphi_r)} + \Lambda e^{i((\Omega_a-\Omega_r)\tau_0+\varphi_a-\varphi_r)}) - \frac{\gamma_b}{2}$$
$$(A e^{i((\Omega_b+1)\tau_0+\varphi_b)} + \overline{A}e^{i((\Omega_b-1)\tau_0+\varphi_b)} + \Lambda e^{i((\Omega_b+\Omega_r)\tau_0+\varphi_b+\varphi_r)} +$$
$$\Lambda e^{i((\Omega_b-\Omega_r)\tau_0+\varphi_b-\varphi_r)}) -$$
$$\kappa\left(\begin{array}{l}+A^3 e^{i3\tau_0} + 3A^2 \Lambda e^{i(2+\Omega_r)\tau_0+\varphi_r)} + 3\overline{A}^2 \Lambda e^{i((\Omega_r-2)\tau_0+\varphi_r)} + \\ +3A\Lambda^2 e^{i((1+2\Omega_r)\tau_0+2\varphi_r)} + 3A\Lambda^2 e^{i((1-2\Omega_r)\tau_0-2\varphi_r)} + \Lambda^3 e^{i(3\Omega_r \tau_0+3\varphi_r)}\end{array}\right) +$$
$$CC$$

(10)

The combinations that achieve the desired dynamical response can be selected based on EQ. (10). Here, prime denotes differentiation with respect to $\tau_1$ and $\overline{\bullet}$ represent the complex conjugate of $\bullet$. The term in the double frame in EQ. 10 leads to a non-periodic solution, whereas terms in single frame may or may not lead to non-periodic solution, depending on the values of $\Omega_a$ and $\Omega_b$ that, in turn, relate to the external signal's frequency, $\Omega_r$.

In order to amplify terms dependent on the external force (preferably avoiding super harmonic resonance at $\Omega_r \approx 1/3$), the following two conditions can be set:

$$\Omega_a \approx 2, \Omega_b+\Omega_r \approx 1. \quad (11)$$

The first condition in EQ. (11) excites the system at its principal parametric resonance and the second condition in EQ. (11) mixes the external excitation with the parametric excitation at the same frequency. The following detuned frequencies are now introduced:

$$\Omega_a=2+\epsilon\sigma_a, \Omega_b+\Omega_r=1+\epsilon\sigma_b \quad (12)$$

where $\sigma_a$ and $\sigma_b$ are detuning parameters.

Substituting EQ. (12) into EQ. (10), provides the condition for eliminating the non-periodic solution, from which the PA response in the vicinity of its natural frequency, $A(\tau_1)$ can be computed:

$$2i\zeta A + 2iA' + 3\kappa A^2 \overline{A} + 6\kappa A\Lambda^2 + \quad (13)$$
$$\frac{\gamma_a}{2}\overline{A}e^{i(\sigma_a \tau_1+\varphi_a)} + \frac{\gamma_b}{2}\Lambda e^{i(\sigma_b \tau_1+\varphi_b+\varphi_r)}=0.$$

Converting to polar form and presenting additional constraints and definitions:

$$A(\tau_1)=\tfrac{1}{2}a(\tau_1)e^{iv(\tau_1)}, \psi_a=\sigma_a \tau_1-2v, \psi_b=\sigma_b \tau_1-v$$

$$\sigma=\tfrac{1}{2}\sigma_a=\sigma_b, \psi=\tfrac{1}{2}\psi_a=\psi_b \quad (14)$$

EQ. (13) can be solved by separating it into real and imaginary parts.

Re: $\psi'a =$ (15)

$$\sigma a - \frac{3}{8}\kappa a^3 - 3\kappa a\Lambda^2 - \frac{\gamma_a}{4}a\cos(2\psi+\varphi_a) - \frac{\gamma_b}{2}\Lambda\cos(\psi+\varphi_b+\varphi_r)$$

Im: $a' = -\zeta a - \frac{\gamma_a}{4}a\sin(2\psi+\varphi_a-2v) - \frac{\gamma_b}{2}\Lambda\sin(\psi+\varphi_b+\varphi_r)$ For the steady state oscillations $\psi'=a'=0$. For these oscillations a is denoted $a_0$ and $\psi$ is denoted $\psi_0$. The solution for $a_0$ is:

$$a_0 = -\frac{2\gamma_b \sin(\psi_0 + \varphi_b + \varphi_r)}{4\zeta + \gamma_a \sin(2\psi_0 + \varphi_a)}\Lambda. \quad (16)$$

EQ. (16) shows that the response of the PA is proportional to the external force amplitude. Large amplification takes place when the denominator is small (e.g., when $0<4\zeta/\gamma_1<1$). The amplification depends on the parametric excitation parameters $\gamma_1$ and $\gamma_2$. $\psi_0$ can be obtained through numerical procedures, and can be extracted from the real part in EQ. (15), once EQ. (16) is substituted therein. This leads to:

$$\cos(\psi_0 + \varphi_b + \varphi_r) - \frac{6\gamma_b^2 \kappa \Lambda^2 \sin^3(\psi_0 + \varphi_b + \varphi_r)}{(4\zeta + \varphi_a \sin(2\psi_0 + \varphi_a))^3} - \quad (17)$$
$$\frac{(12\kappa\Lambda^2 - 4\sigma + \gamma_a \cos(2\psi_0 + \varphi_a))\sin(\psi_0 + \varphi_b + \varphi_r)}{4\zeta + \gamma_a \sin(2\psi_0 + \varphi_a)} = 0$$

This nonlinear equation has multiple solutions and for any computed set of values, the solution of EQ. (5) can be approximated as:

$$x \approx a_0 \cos\left(\frac{\Omega_a}{2}\tau - \psi_0\right) + 2\Lambda\cos(\Omega_r\tau + \varphi_r) == \quad (18)$$
$$a_0 \cos((\Omega_b + \Omega_r)\tau - \psi_0) + 2\Lambda\cos(\Omega_r\tau + \varphi_r)$$

By applying a local stability check (see Nayfeh supra, pages 171-174), the stable and unstable steady-state solutions of EQ. (15) can be identified for every solution branch.

Figure 7:
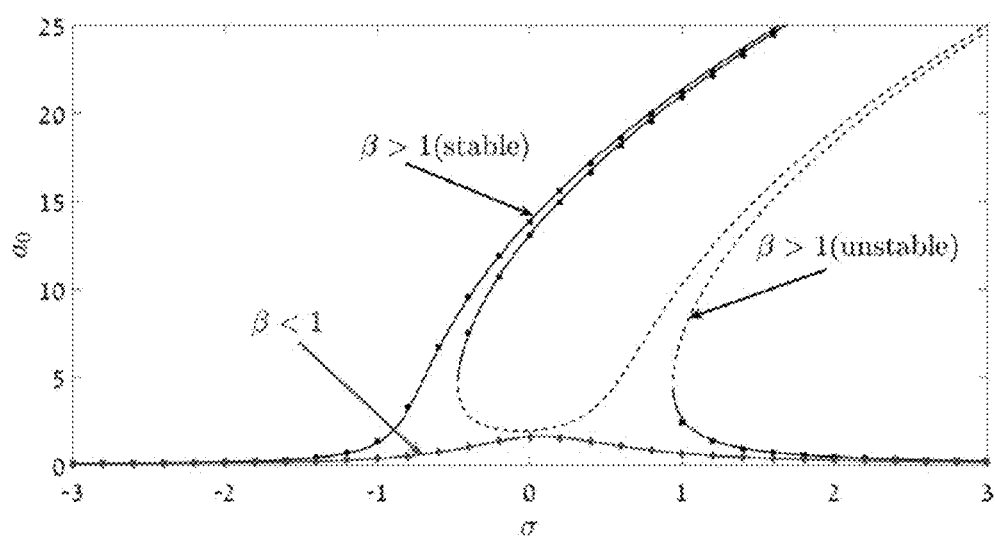

The analytical solution was verified by comparison with a numerical integration of EQ. (3), as is shown in FIG. 7. As shown, the integrated solution compares favorably with the approximate analytical solution. Experimental results with a single degree-of-freedom parametric amplifier are provided below (see FIGS. 18A-25).

Parametric Amplifier with More than One Degree of Freedom

Figure 8:
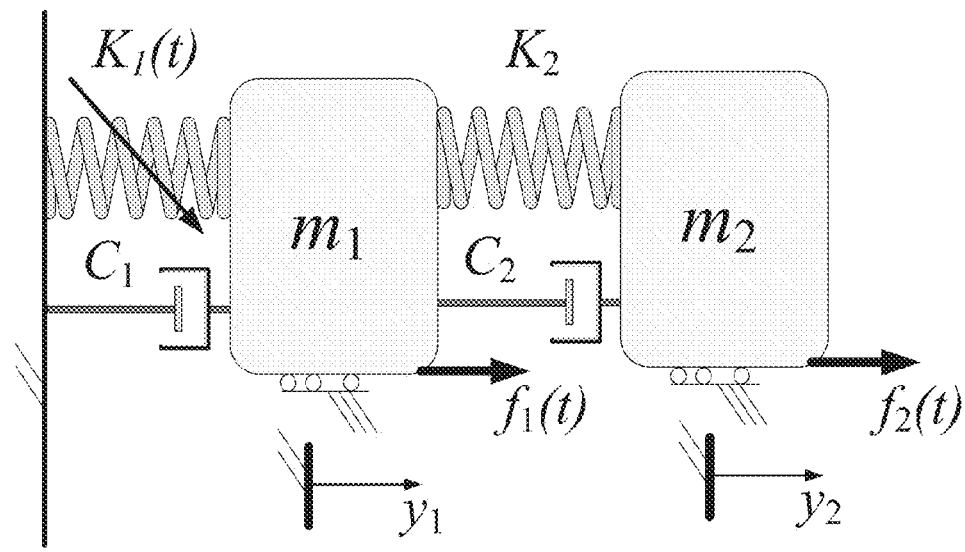

Without loss of generality a two degree-of-freedom PA shown in FIG. 8 is considered as a representative case for a multi-degree-of-freedom PA.

FIG. 8 illustrates a damped oscillator, subjected to slow forces, $f_1$ and $f_2$, which for simplicity are considered as having both the same frequency $\omega_r$ and phase $\phi_r$. One of ordinarily skilled in the art, provided with the following description, would know how to obtain a solution for the case in which not all the forces has the same frequency and/or the same phase.

The oscillator has nonlinear time varying spring K₁(t) and a linear spring $K_2$, for which the restoring forces are as follows:

$$f_{K_1}(t) = -k_1(1 + \alpha_a \cos(\omega_a t + \phi_a) + \alpha_b \cos(\omega_b t + \phi_b))y_1 - sy_1^3$$

$$f_{K_2}(t) = -k_2(y_2 - y_1) \quad (19)$$

The response of the system under a vector of harmonic forces, $(f_1(t), f_2(t))$ is analyzed and the values of $\alpha_a$, $\omega_a$, $\alpha_b$ and $\omega_b$ that amplify the vector of forces are derived. Unlike the SDOF case above, the amplified response can be projected onto either one of the two vibration modes by tuning the parametric excitation frequencies. The EOM are:

$$M\ddot{y} + C\dot{y} + Ky + K^\alpha(t)y + K^{NL-s}(t)y = F \quad (20)$$

where bold symbols denote matrices or vectors. Specifically, the following notations are used in EQ. (20):

$$M = \begin{pmatrix} m_1 & 0 \\ 0 & m_2 \end{pmatrix} \quad C = \begin{pmatrix} C_1 + C_2 & -C_2 \\ -C_2 & C_2 \end{pmatrix} \quad K = \begin{pmatrix} K_1 + K_2 & -K_2 \\ -K_2 & K_2 \end{pmatrix}$$

$$K^\alpha = \begin{pmatrix} K_P & 0 \\ 0 & 0 \end{pmatrix} \quad K^{NL-s} = \begin{pmatrix} sy_1^3 \\ 0 \end{pmatrix} \quad F = \begin{pmatrix} F_1 \cos(\omega_r t + \varphi_r) \\ F_2 \cos(\omega_r t + \varphi_r) \end{pmatrix}$$

$$y = \begin{pmatrix} y_1 \\ y_2 \end{pmatrix}$$

where $K_P$ is defined as $k_1(\alpha_a \cos(\omega_a t + \phi_a) + \alpha_2 \cos(\omega_2 t + \phi_b))$.

The EOM can be transformed to modal coordinates, utilizing the linearized system modes:

$$\Phi = (\phi_1 \quad \phi_2), \quad \Omega_n^2 = \begin{pmatrix} (\omega_n^{(1)})^2 & 0 \\ 0 & (\omega_n^{(2)})^2 \end{pmatrix}. \quad (21)$$

EQ. (21) contains the eigenvectors and the corresponding eigenvalues. The modal transformation yields two modal coordinates, denoted $\eta_1$ and $\eta_2$ corresponding to two linear combinations of $y_1$ and $y_2$. The following transformation is defined:

$$y = \varepsilon\Phi\eta \quad (22)$$

where $\varepsilon \ll 1$ measures the smallness of the amplitudes of the solution. Substituting EQ. (22) into EQ. (20) and multiplying by $\Phi^T$ from the left, leads to the following modal governing EOM:

$$\ddot{\eta} + \Omega_n^2\eta = \tilde{P} - \varepsilon(\xi\dot{\eta} + \tilde{K}(t)\eta + \tilde{\kappa}(\eta_1^3 \eta_1^2\eta_2 \eta_1\eta_2^2 \eta_2^3)^T), \quad (23)$$

where:
$\varepsilon\tilde{\kappa}(\eta_1^3 \eta_1^2\eta_2 \eta_1\eta_2^2 \eta_2^3)T = (1/\varepsilon)\Phi^T K^{NL-s}(\Phi\varepsilon\eta)$, $\varepsilon\zeta = \Phi^T C\Phi$, $\varepsilon\tilde{P} = \Phi^T F$, and $\varepsilon\tilde{K}(t) = \Phi^T K^\alpha(t)\Phi$.

Similarly to the SDOF case above, the method of multiple scales is employed and the solutions of EQ. (23) can be approximated with an expression of the form:

$$\eta(\varepsilon, t) = \underbrace{\begin{pmatrix} \eta_{10}(t_0, t_1) \\ \eta_{20}(t_0, t_1) \end{pmatrix}}_{\eta_0} + \varepsilon\underbrace{\begin{pmatrix} \eta_{11}(t_0, t_1) \\ \eta_{21}(t_0, t_1) \end{pmatrix}}_{\eta_1}, \quad t_i = \varepsilon^i t, \quad i = 0, 1. \quad (24)$$

Substituting EQ. (24) into EQ. (23) and collecting terms of the same order in $\varepsilon$ yields:

$\varepsilon^0$:

$$D_0^2\eta_0 + \Omega_n^2\eta_1 = \tilde{P} \quad (25)$$

$\varepsilon^1$:

$$D_0^2\eta_1 + \Omega_n^2\eta_1 = -\xi D_0\eta_0 - \tilde{K}(t)\eta_0 - 2D_0D_1\eta_0 - \tilde{\kappa}$$
$$(\eta_{10}^3 \eta_{10}^2\eta_{20} \eta_{10}\eta_{20}^2 \eta_{20}^3)T \quad (26)$$

In EQ. 26, $D_i$ denotes differentiation with respect to $t_i$, namely $D_1 \equiv \partial/\partial t$.

The zero order solution can be written as:

$$\eta_{10} = A_1 e^{i\omega_{n1} t_0} + \Lambda_{11} e^{i(\omega_r t_0 + \varphi_r)} + \Lambda_{12} e^{i(\omega_r t_0 + \varphi_r)} + CC, \quad (27)$$
$$\eta_{20} = A_2 e^{i\omega_{n2} t_0} + \Lambda_{21} e^{i(\omega_r t_0 + \varphi_r)} + \Lambda_{22} e^{i(\omega_r t_0 + \varphi_r)} + CC$$

$$\varepsilon\Lambda = \begin{bmatrix} \dfrac{\phi_{11} F_1}{2(\omega_{n_1}^2 - \omega_r^2)} & \dfrac{\phi_{21} F_2}{2(\omega_{n_1}^2 - \omega_r^2)} \\ \dfrac{\phi_{12} F_1}{2(\omega_{n_2}^2 - \omega_r^2)} & \dfrac{\phi_{22} F_2}{2(\omega_{n_2}^2 - \omega_r^2)} \end{bmatrix}$$

It was found by the Inventors of the present invention that energy can be diverted from the external forces to mode No. 1 at frequency, $\omega_{n_1}$, or to mode No. 2 at the frequency $\omega_{n_2}$, by selecting one of the following condition sets:

$$(a)\{\omega_a = 2\omega_n^{(1)}, \omega_b + \omega_r = \omega_n^{(1)}\} (b)\{\omega_a = 2\omega_n^{(2)}, \omega_b + \omega_r = \omega_n^{(2)}\} \quad (28)$$

In various exemplary embodiments of the invention one of the condition sets is selected while reducing or, more preferably, avoiding, sub and internal resonances.

The following perturbed parameters are defined based on the conditions in EQ. (28):

$$(a)\begin{Bmatrix} \omega_a = 2\omega_n^{(1)} + \varepsilon\sigma_a \\ \omega_b + \omega_r = \omega_n^{(1)} + \varepsilon\sigma_b \end{Bmatrix} (b)\begin{Bmatrix} \omega_a = 2\omega_n^{(2)} + \varepsilon\sigma_a \\ \omega_b + \omega_r = \omega_n^{(2)} + \varepsilon\sigma_b \end{Bmatrix}. \quad (29)$$

Substituting EQ. 29(a) or EQ. 29(b) and employing a similar technique as described above with respect to the SDOF PA, provides the condition for eliminating non-periodic solutions, from which the PA steady state response in the vicinity of its natural frequencies can be computed.

Choosing, for example, to divert the energy to mode No. 1 [EQ. (28)(a)], the following steady-state amplitudes are obtained, after converting to polar form as explained above:

$$A_j = \tfrac{1}{2} a_j(t_1) e^{i\gamma_j(t_1)}, j = 1,2$$

The modal amplitudes are:

$$a_{10} = -\frac{2\phi_{11} k_1 \gamma_b (\phi_{11}(\Lambda_{11} + \Lambda_{12}) + \phi_{12}(\Lambda_{21} + \Lambda_{22}))}{2\tilde\zeta_{11}\omega_n^{(1)} + \phi_{11}^2 k_1 \gamma_a \sin(2\psi_{10})} \sin(\psi_{10} + \varphi_r), \quad (30)$$

$$a_{20} = 0.$$

EQ. (30) demonstrates that energy from the external forces at frequency $\omega_r$ can be diverted to a signal at the frequency $\omega_n^{(1)}$ while at the same time mode No. 2, associated with $\omega_n^{(2)}$, has an amplitude approaching zero ($a_{20} = 0 \Rightarrow \eta_2 \approx 0$).

Choosing, for example, to divert the energy to mode No. 2 [EQ. (28)(b)], the two modes change role and only mode No. 2 is excited:

$$a_{20} = -\frac{2\phi_{12} k_1 \gamma_b (\phi_{11}(\Lambda_{11} + \Lambda_{12}) + \phi_{12}(\Lambda_{21} + \Lambda_{22}))}{2\tilde\zeta_{22}\omega_n^{(2)} + \phi_{12}^2 k_1 \gamma_a \sin(2\psi_{20})} \sin(\psi_{10} + \varphi_r), \quad (31)$$

$$a_{10} = 0.$$

Large amplification takes place when the denominator is small, for example, when $0 < 2\tilde\zeta_{11}\omega_n^{(1)}/\phi_{11}^2 k_1 \gamma_a < 1$, for the embodiment in which EQ. (28)(a) is selected, and $0 < 2\tilde\zeta_{22}\omega_n^{(2)}/\phi_{12}^2 k_1 \gamma_a < 1$, for the embodiment in which EQ. (28)(b) is selected.

$\psi_{10}$ and $\psi_{20}$ can be computed numerically from the obtained nonlinear and transcendental equations, leading to the possibility of obtaining multiple solutions. Still, for any computed values, the solution of EQ. (23) is approximated by EQs. (27), (30) and (31).

Applying standard local stability check the stable and unstable steady-state solutions can be identified for every solution branch. The analytical solutions were verified by numerically integrating EQ. (20), as shown in FIGS. 9A, 9B, 10A and 10B.

Analysis of the Analytical Solution and Numerical Verification

The obtained solutions were compared to numerically obtained solutions computed using the Matlab® software. The comparison is outlined below for several cases.

Verification and Analysis of a SDOF Parametric Amplifier

Large amplitudes occur at σ values close to zero, namely in the vicinity of the principal parametric resonance. EQ. (16) reveals that large amplification takes place when the denominator of EQ. (16) is small, and that the amplification also depends on the parametric excitation.

The response amplitude $a_0$ as a function of the frequency σ are shown in FIG. 7 for two sets of parameters such that the parametric excitation becomes $\gamma_a = \beta \times (2\zeta)$. Case (a) $\beta = 0.9 < 1$, the pumping is below threshold of linear instability, and case (b) $\beta = 1.1 > 1$, which is above threshold of linear instability. The parameters are as follows: $\zeta = 3, \gamma_b = 7, \kappa = 10^{-2}, \omega_r - 0°, P = 0.5$ and $10^{-2}$.

FIG. 7 shows agreement between the analytically and numerically derived solutions. In addition, amplification of the response amplitude beyond the linear instability threshold is observed. The transition from operating below to above linear instability threshold leads to transition from bounded to unbounded amplitude, as the frequency increases. Here, the nonlinear, stiffening spring limits the response amplitude. In the nonlinear case, there is a transition from one (possibly three, depending on the chosen values of the parameters) branch of solution to five, where three solutions are stable and two are unstable.

The gain G is defined as the ratio of the response amplitudes with and without pumping:

$$G = \frac{a_0}{2\Lambda} \approx \frac{|x(t)|_{pump}^{\Omega \approx 1}}{|x(t)|_{no\,pump}^{\Omega \approx \Omega_r}}. \quad (32)$$

EQs. (16) and (17) can be differentiated with respect to P and $\phi_r$ (see EQ. (3)) and the sensitivity to changes in the external force amplitude or phase, $S_P^{a_0} = \partial a_0/\partial_p$ and $S_{\phi_r}^{a_0} = \partial a_0/\partial \phi_r$, can be computed. For brevity, closed form expressions for G, $S_P^{a_0}$ and $S_{\phi_r}^{a_0}$ were omitted.

The PA response at its natural frequency, gain, sensitivities and sensitivity ratios were computed at various external force amplitudes and phases for the following set of parameters:

$$\zeta = 3 \gamma_a = 1.1 \times (2\zeta) \gamma_b = 7 \kappa = 10^{-2} \varepsilon - 10^{-2} \quad (33)$$

Figure 11:
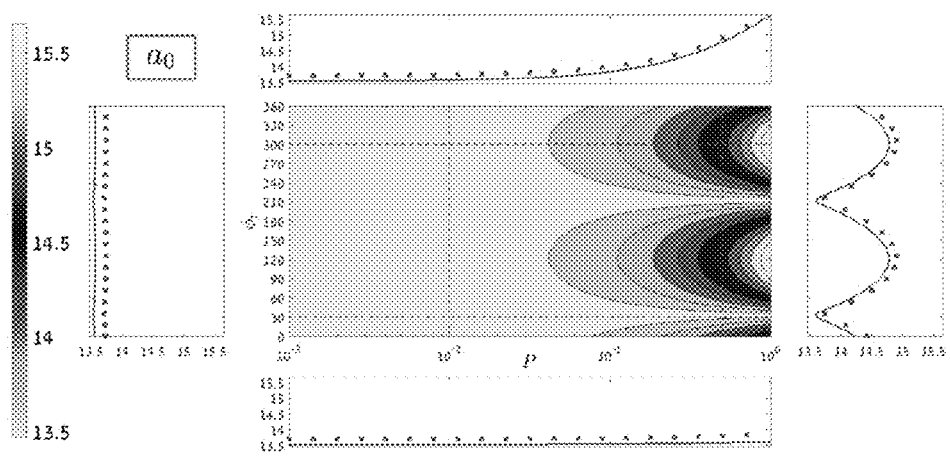

The dependence of the amplitude on the external force amplitude and phase is displayed in FIG. 11. Shown in FIG. 11 are the PA amplitude $a_0$ working above linear instability threshold as a function of the external force's amplitude and phase. Different cross-sections are also presented, starting from the top and going clockwise: $\phi_r=300°$, p=0.5, $\phi_r=30°$ and p=$10^{-2}$. In the cross-sections, data points were computed numerically.

As shown, the response is generally cyclic with respect to $\phi_r$ and the larger p is the stronger the dependency of the response on $\phi_r$. In the particular case shown in FIG. 11, the crests are at about 120° and about 300° whereas the troughs are at about 30° and about 210°. Changes in the parameters may lead to different values. The analytical and numerical solutions are in agreement as shown in the cross-sections of FIG. 11.

The dependence of the PA gain, G, on p and $\phi_r$ is shown in FIGS. 12A and 12B. FIG. 12A shows the gain which was computed analytically and verified numerically at three phases versus the external force amplitude, these phases were chosen due to the observations from FIG. 11. As shown, the gain at the different phases is nearly constant (the lines for $\phi_r$–30°, 115° and 330° overlap), and is therefore substantially phase indifferent. For external force amplitudes up to 0.1, the gain is larger than 100. FIG. 12B shows the gain at different external force amplitudes as a function of the phase. These results also demonstrate the gain is substantially phase indifferent and depends mostly on the external force amplitude.

The PA sensitivity to the external force amplitude, $S_p^{a_0}$, is shown in FIG. 13. Shown in FIG. 13 is $S_p^{a_0}$ as a function of the external force's amplitude and phase. Also shown are different cross-sections, starting from the top and going clockwise: $\phi_r=300°$, p=0.5, $\phi_r=30°$ and p=$10^{-2}$. FIG. 13 demonstrates that there are phases for which the amplitude sensitivity is higher. The sensitivity is generally constant over a wide range of external force amplitudes.

The ratio $SR_{\phi_r}^P = S_p^{a_0}/S_{\phi_r}^{a_0}$, can be used as an indicator regarding the sensitivity of the PA to phase or amplitude of the external force phase or amplitude. And the parameters of the PA can be selected to provide a desired value for this ratio. For example, when it is desired to use the PA as a phase insensitive amplifier, the parameter are optionally and preferably selected such that the ratio is above a predetermined threshold (e.g., $SR_{\phi_r}^P \geq 10$), and when it is desired to use the PA as an amplitude insensitive amplifier, the parameter are optionally and preferably selected such that the ratio is below a predetermined threshold (e.g., $SR_{\phi_r}^P \leq 0.1$).

The SDOF PA can is constituted to allow controlling the pumping phases. In this embodiment, the governing EOM is given by Eq.(3), $$\ddot{y}+\zeta_z\dot{y}+(1+\alpha_a\cos(\Omega_a\tau+\phi_a)+\alpha_b\cos(\Omega_b\tau+\phi_b))y+\kappa y^3=p_t\cos(\Omega_r\tau+\phi_r)$$

Following the procedure of multiple scales, the PA response is:

$$a_0 = -\frac{2\gamma_b\sin(\psi_0+\varphi_b+\varphi_r)}{4\zeta+\gamma_a\sin(2\psi_0+\varphi_a)}\Lambda. \quad (EQ.\ 33a)$$

The nonlinear transcendental equation from which $\psi_0$ can be computed can be written as:

$$\cos(\psi_0+\varphi_b+\varphi_r)-\frac{6\gamma_b^2\kappa\Lambda^2\sin^3(\psi_0+\varphi_b+\varphi_r)}{(4\zeta+\gamma_a\sin(2\psi_0+\varphi_a))^3}-\frac{(12\kappa\Lambda^2-4\sigma+\gamma_a\cos(2\psi_0+\varphi_a))\sin(\psi_0+\varphi_b+\varphi_r)}{4\zeta+\gamma_a\sin(2\psi_0+\varphi_a)}=0. \quad (EQ.\ 33b)$$

From EQ. (16) and (17) it follows that changes in $\phi_b$, are equivalent to changes in $\phi_r$, so that the aforementioned procedure can be executed to select the desired working regions. Additional parameters can be selected to enhance the ability of controlling the working regions.

Exemplified working regions according to some embodiments of the present invention are shown in FIGS. 14A and 14B, for $\phi_b=0$ (FIG. 14A) and $\phi_b=90°$ (FIG. 14B). In FIGS. 14A and 14B blue regions corresponds to a ratio of 10 or larger (phase indifferent), red regions correspond to a ratio of 0.1 or smaller (amplitude indifferent), and white regions correspond to a ratio between 0.1 and 10. As shown there is an identifiable difference between the region maps in FIGS. 14A and 14B due to the change in $\phi_b$. Specifically, there is a phase shift of 90° between the regions in FIG. 14A and the regions in FIG. 14B.

Verification and Analysis of a Parametric Amplifier with More than One DOF

A numerical verification was carried out to assess the accuracy of the results presented in EQs. (30) and (31). The following parameters were selected for the case study:

$$M = \begin{pmatrix} 1 & 0 \\ 1 & 0 \end{pmatrix}[Kg],\ C = \begin{pmatrix} 0.1 & 0 \\ 0 & 0.1 \end{pmatrix}[Ns/m],$$

$$K = \begin{pmatrix} 100 & 0 \\ 0 & 400 \end{pmatrix}[N/m],\ s=1[N/m^3],\ \varepsilon=10^{-2},$$

so that the corresponding following natural frequencies and normal modes are:
$\omega_n^{(1)}=6.84$ [rad/sec] $\omega_n^{(2)}=29.20$[rad/sec]
$\phi_1=\{-0.6618\ -0.7497\}^T\ \phi_2=\{-0.7497\ 0.6618\}^T$,
The external forces are defined as:

$$F = \mu\left(\frac{F}{\sqrt{1-F^2}}\right)\cos(\omega_r t+\varphi_r)\ |F|\leq 1, \quad (34)$$

so that F defines the projection of the force vector on the modal coordinates, and μ defines its magnitude. The parameter F was chosen such that the force vector's projection on both normal modes is equal, leading to the following numerical values:

$$\mu=0.1 F=0.99781\ \phi_r=0. \quad (35)$$

Figure 9A:
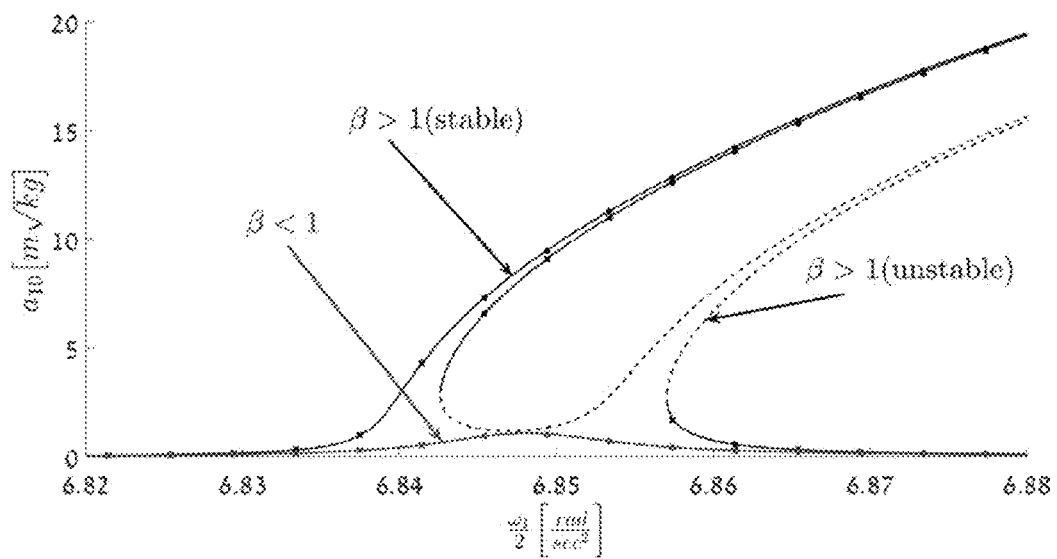
Figure 10A:
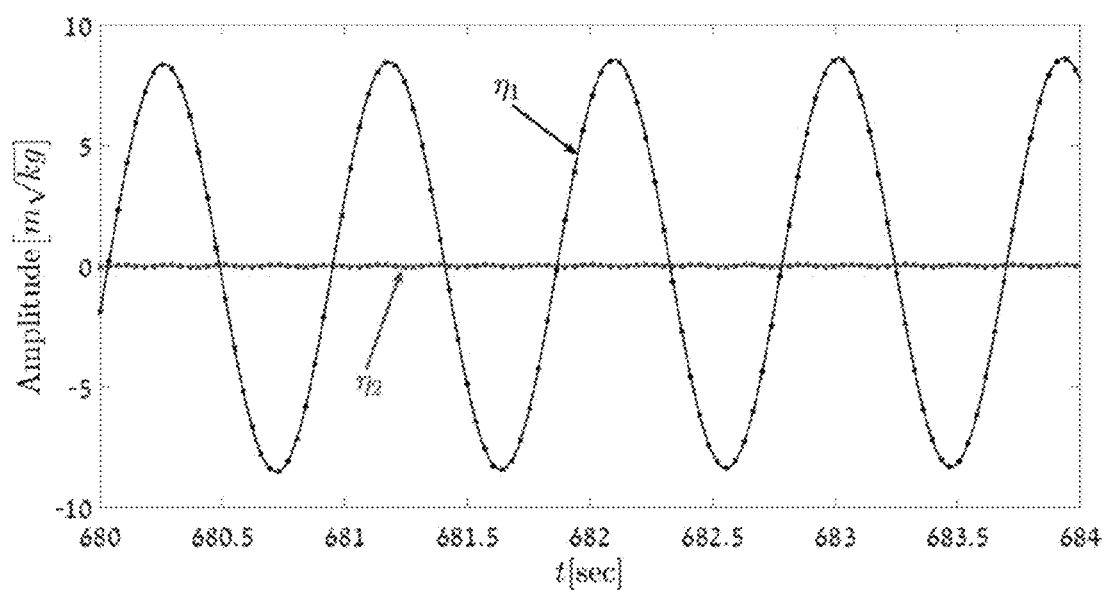

The energy can be diverted from the external forces to the first mode by selecting $\omega_a\approx 2\omega_n^{(1)}$ and $\omega_b+\omega_r\approx\omega_n^{(1)}$, where the external excitation $\omega_r=0.1\omega_n^{(1)}$ is lower than the first natural frequency. The PA of the present case can be operated below and above the linear instability threshold. The parameter $\gamma_a$ is defined as $\gamma_a=\beta\times(2\zeta_{11}\omega_n^{(1)}/\phi_{11}^2k_1)$ The response amplitude $a_{10}$ as a function of $0.5\omega_a$, are shown in FIG. 9A for $\beta=0.95$ and $\beta=1.05$. Stable solutions are shown in continuous lines, and unstable solutions are shown in dashed lines. In this study, $\gamma_b$ was selected to be $\gamma_b=0.5\gamma_a$. The PA's effect can be assessed from FIG. 10A that shows the evolution of modal coordinates as a function of the time. FIG. 10A shows that the energy is diverted to the first natural frequency $\omega_n^{(1)}\rightarrow\eta_1$ while the response in the other mode, $\eta_2$, is kept close to zero.

Figure 9B:
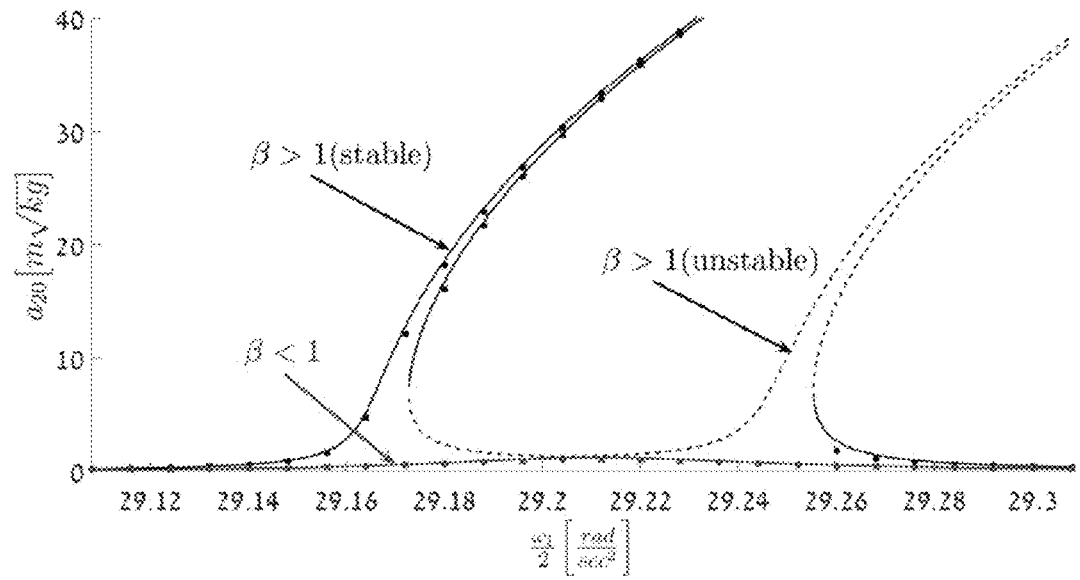
Figure 10B:
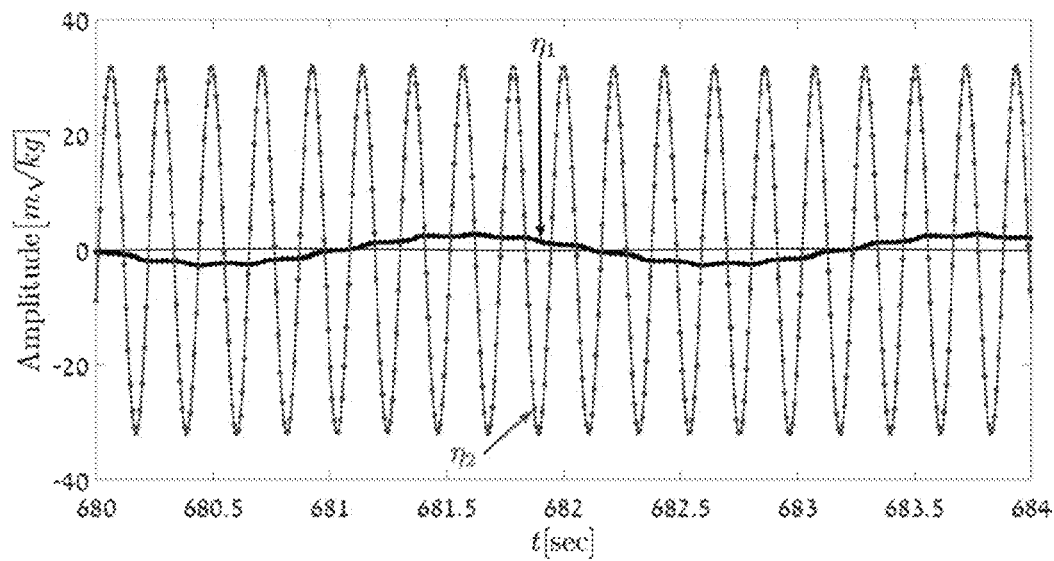

For the second natural frequency, the selected frequencies were $\omega_a\approx 2\omega_n^{(2)}$ and $\omega_b+\omega_r=\omega_n^{(2)}$, with $\omega_r=0.1\omega_n^{(2)}$ and $\gamma_a=\beta\times(2\zeta_{22}\omega_n^{(2)}/\phi_{12}^2k_1)$. The response amplitude $a_{20}$ as a function of $0.5\omega_a$ are shown in FIG. 9B for $\beta=0.95$ and $\beta=1.05$. Stable solutions are shown in continuous lines, and unstable solutions are shown in dashed lines. In this study, $\gamma_b$ was also selected to be $\gamma_b=0.5\gamma_a$. The PA's effect can be assessed from FIG. 10B that shows the evolution of modal coordinates as a function of the time. FIG. 10B shows that the energy is diverted to the first natural frequency $\omega_n^{(2)} \to \eta_2$ while the response in the other mode, $\eta_1$, is kept close to zero.

The results obtained for two DOF (e.g., FIGS. 9A and 9B) are similar to those obtained with a single DOF (FIG. 7).

EQs. (30) and (31) and the matching nonlinear equations from which $\psi_{10}$ and $\psi_{20}$ are computed, were differentiated with respect to $\mu$. From the differentiated equations, closed form expressions for the sensitivities of the responses with respect to the external force vector magnitude $\mu$ were derived, $S_\mu^{a10}=\partial a_{10}/\partial \mu$, and $S_\mu^{a20}=\partial a_{20}/\partial \mu$. FIG. 15A shows the analytically computed responses of the system, when subjected to pumping frequencies according to the conditions formulated in EQ. (28) and its numerical verification. FIG. 15B shows the corresponding sensitivities. The responses and sensitivities shown in FIGS. 15A and 15B are similar to the SDOF response (see FIG. 11).

Identification of Angular Location of a Rotation Imbalance

FIGS. 17A-C illustrate a procedure suitable for identifying the angular location of a rotation imbalance, in a system, such as the system illustrated in FIGS. 5A and 5B, according to some embodiments of the present invention. The mandrel is rotated and oscillated as further detailed hereinabove. The phase $\phi_b$ of the drive signal is varied to find a minimal output amplitude. The angular location $\phi$ corresponding to the phase at minimal output amplitude is then calculated (FIG. 17A). This can be done numerically or graphically using a calibration curve. Generally, there can be 2 solutions 180° degrees away from one another. A trial mass M is then placed about 90° away from the unbalance location (FIG. 17B).

The mandrel is rotated and oscillated with the trial mass and the phase $\phi_b$ of the drive signal is varied to re-find the minimal output amplitude. The angular location $\phi_M$ corresponding to the phase at minimal output amplitude is then calculated (FIG. 17C). Again, there can be 2 solutions 180° degrees away from one another. The angular location of the unbalance can then be found based on the angular shift between $\phi$ and $\phi_M$.

Experiments with a Dual Frequency Parametric Amplifier

A dual frequency parametric amplifier was experimentally test using an experimental setup (FIG. 26) including a modular mass (removable brass disks), two leaf springs enforcing a motion of the mass parallel to the ground, and a linear acoustic-coil actuator. The deflection was measured using a laser displacement sensor (Keyence™ LK-H027, Osaka, Osaka Prefecture, Japan). To tune the parametric excitation and nonlinear stiffness, the actuator was driven via a real-time digital signal processor (DSP; dSPACE 1104) which also served as a data acquisition device and a displacement (shown as y(t) in FIG. 26) dependent function generator. The actuator's circuit included a current amplifier, which simplified both the model and the force determination scheme as the force is (nominally) linearly related to the induced current. In this case, when using a current amplifier, the source can be modeled as an ideal current source. The current amplifier output was proportional to the input voltage, hence $F=T_m i(t)=T_m A_C(t)$, where F(N) is the force exerted by the actuator, $T_m$(N/A) is the acoustic-coil constant, $A_c$(A/V) is the current amplifier constant, i(t) is the instantaneous current, and V(t) is the input voltage to the current amplifier.

Nonlinear Frequency Response

Direct excitation and pumping parameters were:

$F=0.5N,$ $\omega_r=0.1\ \omega_n$ rad/s, $k_3=c\omega_n(8/3)\sqrt{41}\times 10^5\ N/m^3,$ $\alpha_a=\alpha_b=1.01\alpha_{LTH},$ $\omega_a=2\omega_n$ rad/s, $\omega_b=\omega_n-\omega_r$ rad/s, and $\omega_r=\omega_a=\omega_b=0.$  (EQ. 36)

The nonlinear frequency response is shown in FIGS. 18A-B, where FIG. 18A shows the response amplitude near the natural frequency $\omega_a/2 \approx \omega_n$, and FIG. 18B shows the response amplitude at the direct excitation frequency $\omega_r$. FIGS. 18A-B compare the measured, analytical and numerical calculations on a single plot, providing an overview of the obtained accuracy. Analytical stable (S) branches are shown by continuous lines, analytical unstable branch is shown by a dashed line, and numerical and experimental results are shown by data markers. As shown, there is a close match between the analytical and experimental different results. Energy transfers from the direct excitation frequency $\omega_r$ to the natural frequency $\omega_n$. As the pumping frequency increases, $a_r$ decreases while $a_0$ increases.

The analytical model successfully predicts the decrease in $a_r$ as a function of the pumping frequency. The prediction was made by computing the next order of the solution in the Equation:

$$D_0^2 x_1 + x_1 = -(2i\zeta\Omega_r\Lambda + 6\kappa\tilde{A}A\Lambda + 3\kappa\Lambda^3)e^{j(\Omega_r\tau_0+\phi_r)} + CC \quad (EQ.\ 37)$$

otherwise, the predicted amplitude would have been a constant.

Gain and Sensitivity

According EQ. (10) above the amplifier response contains several frequencies due to the nonlinearity, direct excitation and pumping. Additional frequencies exist and can be obtained by considering higher orders in E. The system parameters can be tuned in a manner that most of the energy is transferred to the natural frequency, so that the amplitude is amplified to a value near its maximal value. To assess the performance of a parametric amplifier, it is advantageous to evaluate its sensitivity to variations in the direct excitation amplitude $a_r$ and phase $\phi_r$.

The amplifier gain G is defined as the ratio of the amplitude at the natural frequency $a_0$ to the amplitude at the external force frequency $a_r$: $G=a_0/a_r$. FIG. 19 shows the gain G for the derived nonlinear frequency response. As shown, the gain grows with the pumping frequency until the solution branch is no longer stable in practice. In FIG. 19, analytically computed gain of the theoretical model is shown by a line, continuous (S)—stable branch, dashed (U.S.)—unstable branch, and numerically computed gain from the measurements is shown by data markers. The gain can optionally and preferably be tuned by actively controlling the pumping frequency, up to 170% in this case.

The response was analyzed for several scenarios. Firstly, the direct excitation and pumping parameters were set according as defined above except (EQ. 36) for the direct excitation phase $\omega_r$. In EQ. 16, the direct excitation phase $\omega_r$ and the pumping phase $\omega_b$ appear as a sum, so that the variations in $\omega_r$ have the same influence on the response as $\omega_b$.

FIGS. 20A-B show the amplifier's amplitude near the natural frequency (FIG. 20A) and at the direct excitation frequency $\omega_r$ (FIG. 20B) as a function of the direct excitation phase. Analytical results are shown by continuous lines, experimental and numerical results are shown by data markers. As shown the analytical, numerical and experimental results are close in value. Note that $a_0$ varies significantly with $\phi_r$ or $\phi_b$, (from about 0.19 mm to about 0/76 mm, see FIG. 20A), and can therefore be optionally and preferably used to estimate the phase of the direct excitation. This is particularly useful in identification of mass unbalance.

The sensitivity, defined in the present case as:

$$S_P^{a_0} = \frac{\partial |y|_{\omega \approx \omega_n}}{\partial F} \qquad \text{(EQ. 38)}$$

was calculated by differentiating EQs. 33a and 33b with respect to P, the scaled version of the direct excitation amplitude F. The resulted analytical expression is lengthy and is not shown for brevity, but the ordinarily skilled person would know how to obtain the analytical expression for the sensitivity by differentiating EQs. 33a and 33b.

The same parameters as in EQ. (36) were used to study the gain and sensitivity, except for the value of the pumping phase $\phi_b$ which was set to 130°, and the direct excitation amplitude which was varied. The results are depicted in FIGS. 21A and 21B, showing the amplitude near the natural frequency (FIG. 21A) and at the direct excitation frequency (FIG. 21B) as a function of the direct excitation amplitude F. The results are shown by continuous lines, numerical and experimental results are shown by data markers, and a fitted curve of the experimental results is shown by a continuous line. FIGS. 21A-B demonstrate agreement between the numerical and the experimental results.

FIG. 22 shows the gain as computed from the results shown in FIGS. 21A and 21B. For weak forces, a large gain of more than 25 was produced. This gain increases is discussed below.

FIG. 23 shows the amplitude sensitivity near the natural frequency to variations in the direct excitation amplitude as a function of the direct excitation amplitude. Analytical sensitivity is shown by a continuous line, numerical sensitivity is shown by data markers, and the numerically computed sensitivity from the measurements using a fitted line is shown by a continuous line. FIG. 23 demonstrates an agreement between the analytical, numerical and experimental results. The sensitivity was calculated over a wide range of the direct excitation amplitude (from about 0.005N to about 0.5 N). As shown, the sensitivity grows as the force amplitude decays. This is useful for amplifying weak forces.

The dual frequency operating mode of the parametric amplifier is tunable, allowing to control its input and output, for example, to select the signal frequency to be amplified, to control the sensitivity and/or to control gain. The ability of the amplifier to provide a controlled sensitivity was demonstrated. The tuning parameters were:

$\omega_r = 0.1\omega_n$ rad/s, $k_3 = c\omega_n(8/3)\sqrt{41} \times 10^5$ N/m³, $\alpha_a = 1.01\alpha_{LTH}$, $\alpha_b = 1.1\alpha_{LTH}$, $\omega_a = 1.9918\ \omega_n$ rad/s, $\omega_b = \omega_n - \omega_r$ rad/s $\phi_r = \phi_a = 0$, and $\phi_b = 130°$. (EQ. 39)

These parameters differ from those listed in EQ. (36), in the operation frequency (slightly below the natural frequency, $\tau < 0$), the pumping magnitude $\alpha_b$ (was made larger), the nonlinearity $k_3$ (decreased), and the pumping phase, $\phi_b$ (set to 130°).

FIGS. 24A-B show the amplitude near the natural frequency (FIG. 24A) and at the direct excitation frequency (FIG. 24B) as a function of the direct excitation amplitude F. Analytical results are shown by continuous lines, numerical and experimental results are shown by data markers, and a fitted curve of the experimental results is shown by a continuous line.

FIG. 25 shows the amplitude sensitivity near the natural frequency to variations in the direct excitation amplitude, obtained using the parameters listed in EQ. 39. Analytical sensitivity is shown by a continuous line, numerical sensitivity is shown by data markers, numerically computed sensitivity from the measurements is shown by data markers, and numerically computed sensitivity from the measurements using a fitted line is shown by a continuous line. FIGS. 24A-25 demonstrate agreement between the numerical and the experimental results. As shown in FIG. 25, by tuning the parameters, a higher amplitude was produced over a wide range of direct excitation amplitudes. The sensitivity was increased to more than 20 mm/N (FIG. 25), which is more than double the sensitivity observed in FIG. 23. Tuning the sensitivity had a small effect on the gain, although for forces weaker than 0.3N the gain was about 20% lower and for stronger external excitation amplitudes, it was higher.

Thus, the present embodiments provide a design tool to control the feedback parametric excitation and the nonlinearity. The characteristics of the parametric amplifier are controllable in situ. To improve performance it is advantageous to identify the linear stability threshold $\gamma_{LTH}$ and damping coefficient $\hat{\zeta}$. The present Example demonstrates that the gain and sensitivity can be controlled by tuning the pumping and nonlinear term. The present Example demonstrates that for weaker input force the gain and sensitivity are higher. The parametric amplifier of the present embodiments can be utilized to identify a signal by extracting its phase and amplitude. The direct excitation phase $\omega_r$ can be found by sweeping $\omega_b$ until a minimal response amplitude is reached (see FIG. 20A). Once the phase is determined, its amplitude can optionally and preferably be computed using EQs. 16 and 18. The present example demonstrates that the parametric amplifier of the present embodiments has a narrow-band selectivity of the input. This is useful, for example, when the amplifier is utilized as a filter, in a similar manner to a lock-in amplifier.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

1. Géradin, M. and D. J. Rixen, Mechanical vibrations: theory and application to structural dynamics. 2014: John Wiley & Sons.
2. Gasch, R., Dynamic behaviour of the Laval rotor with a transverse crack. Mechanical Systems and Signal Processing, 2008. 22(4): p. 790-804.
3. Genta, G., Dynamics of rotating systems. 2005: Springer, New York.
4. Matsukura, Y., et al., On the balancing convergence of flexible rotors, with special reference to asymmetric rotors. Journal of Sound and Vibration, 1979. 63(3): p. 419-428.
5. Parkinson, A., The vibration and balancing of shafts rotating in asymmetric bearings. Journal of Sound and Vibration, 1965. 2(4): p. 477-501.
6. Ishida, Y. and T. Yamamoto, Linear and nonlinear rotordynamics: a modern treatment with applications. 2013: John Wiley & Sons.
7. Darlow, M. S., Balancing of high-speed machinery: Theory, methods and experimental results. Mechanical Systems and Signal Processing, 1987. 1(1): p. 105-134.
8. Bucher, I. and A. Elka. Balancing of a north seeking device using partial, noisy and delayed measurements. in 9th International Conference on Vibrations in Rotating Machinery. 2008. Exeter, U K.
9. Plat, H., Methods for Sensing and creating Propagating waves and vibrations Using parametric excitation, PhD Thesis, in Mechanical Engineering. 2012, Technion: Haifa.
10. Plat, H. and I. Bucher, Optimizing parametric oscillators with tunable boundary conditions. Journal of Sound and Vibration, 2013. 332(3): p. 487-493.

What is claimed is:

1. A system for converting an input oscillation having an input frequency into an output oscillation having an output frequency, the system comprising:
    a controller configured for receiving the input oscillation and responsively generating a multi-component drive signal, wherein a frequency of at least one component of said drive signal is other than two times the input frequency;
    an oscillator for generating pump oscillations responsively to said drive signal and applying parametric excitation to the input oscillation at said pump oscillations.

2. The system according to claim 1, wherein a frequency of a second component of said drive signal equals about two times the output frequency.

3. The system according to claim 1, wherein a sum or a difference between the output frequency and said frequency of said at least one component, in absolute value, approximately equals the input frequency.

4. The system according to claim 1, wherein said frequency of said at least one component is other than an integer multiplication of said input frequency.

5. The system according to claim 1, wherein for each component of said drive signal, a frequency of said component is other than an integer multiplication of said input frequency.

6. The system according to claim 1, wherein said controller is configured for receiving a predetermined gain value and selecting amplitude and phase for each component so as to amplify the input oscillation by said received gain value.

7. The system according to claim 1, wherein said controller is configured for receiving a predetermined sensitivity value and selecting amplitude and phase for each component such that a sensitivity of the output oscillation to a change in the input oscillation equals said received sensitivity value.

8. The system according to claim 1, wherein said controller is configured for selecting amplitude and phase for each component so as to provide in-phase output oscillation.

9. The system according to claim 1, wherein said drive signal comprises an amplitude limiter component.

10. The system according to claim 1, serving as a filter.

11. A method of converting an input oscillation having an input frequency into an output oscillation having an output frequency, the method comprising:
    receiving the input oscillation;
    generating a multi-component drive signal responsively to the input oscillation, wherein a frequency of at least one component of said drive signal is other than two times the input frequency;
    generating pump oscillations responsively to said drive signal; and
    applying parametric excitation to the input oscillation at said pump oscillations.

12. The method according to claim 11, wherein a frequency of a second component of said drive signal equals about two times the output frequency.

13. The method according to claim 11, wherein for each component of said drive signal, a frequency of said component is other than an integer multiplication of said input frequency.

14. The method according to claim 11, further comprising receiving a predetermined gain value and selecting amplitude and phase for each component so as to amplify the input oscillation by said received gain value.

15. The method according to claim 11, further comprising receiving a predetermined sensitivity value and selecting amplitude and phase for each component such that a sensitivity of the output oscillation to a change in the input oscillation equals said received sensitivity value.

16. The method according to claim 11, further comprising selecting amplitude and phase for each component so as to provide in-phase output oscillation.

17. The method according to claim 11, wherein said drive signal has an amplitude limiter component.

* * * * *